United States Patent
Patel et al.

(10) Patent No.: US 9,491,112 B1
(45) Date of Patent: Nov. 8, 2016

(54) ALLOCATING PROCESSOR RESOURCES BASED ON A TASK IDENTIFIER

(71) Applicant: Amazon Technologies, Inc., Seattle, WA (US)

(72) Inventors: Rahul Gautam Patel, Austin, TX (US); William John Earl, Burien, WA (US); Nachiketh Rao Potlapally, Arlington, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/566,648

(22) Filed: Dec. 10, 2014

(51) Int. Cl.
*G06F 9/455* (2006.01)
*H04L 12/911* (2013.01)

(52) U.S. Cl.
CPC ........... *H04L 47/70* (2013.01); *G06F 9/45558* (2013.01); *G06F 2009/45579* (2013.01); *G06F 2009/45591* (2013.01)

(58) Field of Classification Search
CPC .. G06Q 30/00; G06Q 30/06; H04L 12/1403; H04L 67/325; H04L 47/76; H04L 47/70; G01R 31/2801; G06F 9/505; G06F 9/5027; G06F 9/5061
See application file for complete search history.

(56) References Cited

U.S. PATENT DOCUMENTS

| | | | |
|---|---|---|---|
| 5,437,047 A | 7/1995 | Nakamura | |
| 5,581,463 A * | 12/1996 | Constant | G01R 31/2801 222/638 |
| 5,742,792 A | 4/1998 | Yanai et al. | |
| 7,036,002 B1 | 4/2006 | Ugon | |
| 7,054,883 B2 | 5/2006 | Heasley et al. | |
| 8,146,078 B2 | 3/2012 | Bennett et al. | |
| 8,583,467 B1 | 11/2013 | Morris et al. | |
| 8,738,860 B1 | 5/2014 | Joyce et al. | |
| 8,856,400 B1 | 10/2014 | Davidson et al. | |
| 8,972,637 B1 | 3/2015 | Hushon, Jr. et al. | |
| 9,026,694 B1 * | 5/2015 | Davidson | G06F 9/505 710/38 |
| 2003/0061262 A1 | 3/2003 | Hahn et al. | |
| 2003/0084336 A1 | 5/2003 | Moore et al. | |
| 2005/0097556 A1 | 5/2005 | Code et al. | |
| 2007/0136531 A1 | 6/2007 | Liu et al. | |
| 2008/0040481 A1 * | 2/2008 | Joshi | G06Q 30/00 709/226 |

(Continued)

OTHER PUBLICATIONS

U.S. Appl. No. 14/502,891, filed Sep. 30, 2014, Titled: Allocation of Shared System Resources.
U.S. Appl. No. 14/509,980, filed Oct. 8, 2014, Titled: Micro-Architecturally Delayed Timer.
U.S. Appl. No. 14/509,984, filed Oct. 8, 2014, Titled: Noise Injected Virtual Timer.

(Continued)

*Primary Examiner* — Tuan Vu
(74) *Attorney, Agent, or Firm* — Kilpatrick Townsend & Stockton LLP

(57) ABSTRACT

Techniques are described for accumulating unused computing resources. The techniques may involve receiving a request to execute a task for a tenant on shared hardware resources and assigning a task identifier to the task. A baseline resource credit per time interval of a computing resource can be determined based on a service level agreement associated with the tenant. The techniques may further involve monitoring a performance counter associated with the computing resource to determine a utilization amount of the computing resource by the task during a first time interval, determining an unused amount of the computing resource in the first time interval based on a difference between the utilization amount and the baseline resource credit and incrementing a resource credit balance associated with the task identifier by the unused amount of the computing resource.

13 Claims, 19 Drawing Sheets

(56) References Cited

U.S. PATENT DOCUMENTS

| | | | |
|---|---|---|---|
| 2008/0126820 A1 | 5/2008 | Fraser et al. | |
| 2009/0089564 A1 | 4/2009 | Brickell et al. | |
| 2011/0010461 A1* | 1/2011 | Lassila | H04L 12/1403 709/231 |
| 2011/0145657 A1 | 6/2011 | Bishop et al. | |
| 2011/0238919 A1 | 9/2011 | Gibson et al. | |
| 2012/0137075 A1 | 5/2012 | Vorbach et al. | |
| 2012/0224482 A1* | 9/2012 | Gramling | G06Q 30/06 370/231 |
| 2012/0331464 A1 | 12/2012 | Saito et al. | |
| 2013/0304903 A1 | 11/2013 | Mick et al. | |
| 2014/0059551 A1* | 2/2014 | Umanesan | H04L 67/325 718/102 |
| 2014/0075125 A1 | 3/2014 | Biswas et al. | |
| 2014/0201303 A1 | 7/2014 | Dalal et al. | |
| 2014/0372786 A1 | 12/2014 | Wohlgemuth et al. | |
| 2014/0378094 A1* | 12/2014 | Gillick | H04M 15/7652 455/406 |
| 2015/0052614 A1 | 2/2015 | Crowell et al. | |
| 2015/0128142 A1 | 5/2015 | Fahim et al. | |
| 2015/0277949 A1 | 10/2015 | Loh et al. | |

OTHER PUBLICATIONS

U.S. Appl. No. 14/566,642, filed Dec. 10, 2014, Titled: Allocating Processor Resources Based on a Service-Level Agreement.

Yarom, Yuval and Katrina Falkner. "Flush+Reload: a High Resolution, Low Noise, L3 Cache Side-Channel Attack" *IACR Cryptology ePrint Archive*, 2013: 448, 14 pages.

Aciicmez et al., "On the Power of Simple Branch Prediction Analysis", International Association for Cryptologic Research, Oct. 2006, pp. 1-16.

Agosta et al., "Countermeasures for the Simple Branch Prediction Analysis", International Association for Cryptologic Research, Dec. 21, 2006, pp. 1-4.

Page, "Partitioned Cache Architecture as a Side-Channel Defence Mechanism", Internet Citation, Available online at http://citeseer.ist.psu.edu/cache/papers/cs2/433/http:zSzzSzeprint.iacr.orgzSz2005zSz280.pdf/page05partitioned.pdf, 2005, 14 pages.

Percival, "Cache missing for fun and profit", Internet Citation, Available online at www.daemonology.net/papers/htt.pdf, May 2005, pp. 1-13.

Zhou et al., "Side-Channel Attacks: Ten Years After Its Publication and the Impacts on Cryptographic Module Security Testing", International Association for Cryptologic Research, Oct. 2005, pp. 1-34.

* cited by examiner

| Shared Hardware Structures | |
|---|---|
| VM ID 1 | xxxxxxxxxxxxxxxxx |
| VM ID 1 | xxxxxxxxxxxxxxxxx |
| VM ID 2 | xxxxxxxxxxxxxxxxx |
| VM ID 1 | xxxxxxxxxxxxxxxxx |
| VM ID 2 | xxxxxxxxxxxxxxxxx |
| VM ID 1 | xxxxxxxxxxxxxxxxx |
| VM ID 1 | xxxxxxxxxxxxxxxxx |
| VM ID 1 | xxxxxxxxxxxxxxxxx |
| VM ID 2 | xxxxxxxxxxxxxxxxx |
| VM ID 2 | xxxxxxxxxxxxxxxxx |
| VM ID 2 | xxxxxxxxxxxxxxxxx |
| VM ID 1 | xxxxxxxxxxxxxxxxx |
| VM ID 1 | xxxxxxxxxxxxxxxxx |

ALLOCATING PROCESSOR RESOURCES BASED ON A TASK IDENTIFIER

BACKGROUND

In a multi-tenant environment where multiple tenants or users may concurrently execute tasks on the same computing device, virtualization technologies can be used to provide each tenant with one or more virtual machines that act as discrete computing units within the same computing device. Each virtual machine may have its own dedicated computing resources allocated to the corresponding tenant. However, because each tenant may implement different services or functionalities on the same computing device, the amounts and types of computing resources that may be required by each tenant can be different and may change over time.

BRIEF DESCRIPTION OF THE DRAWINGS

Various embodiments in accordance with the present disclosure will be described with reference to the drawings, in which:

FIG. 9 illustrates an exemplary implementation of a shared hardware structure, according to certain example embodiments of the disclosure;

DETAILED DESCRIPTION

Figure 1:
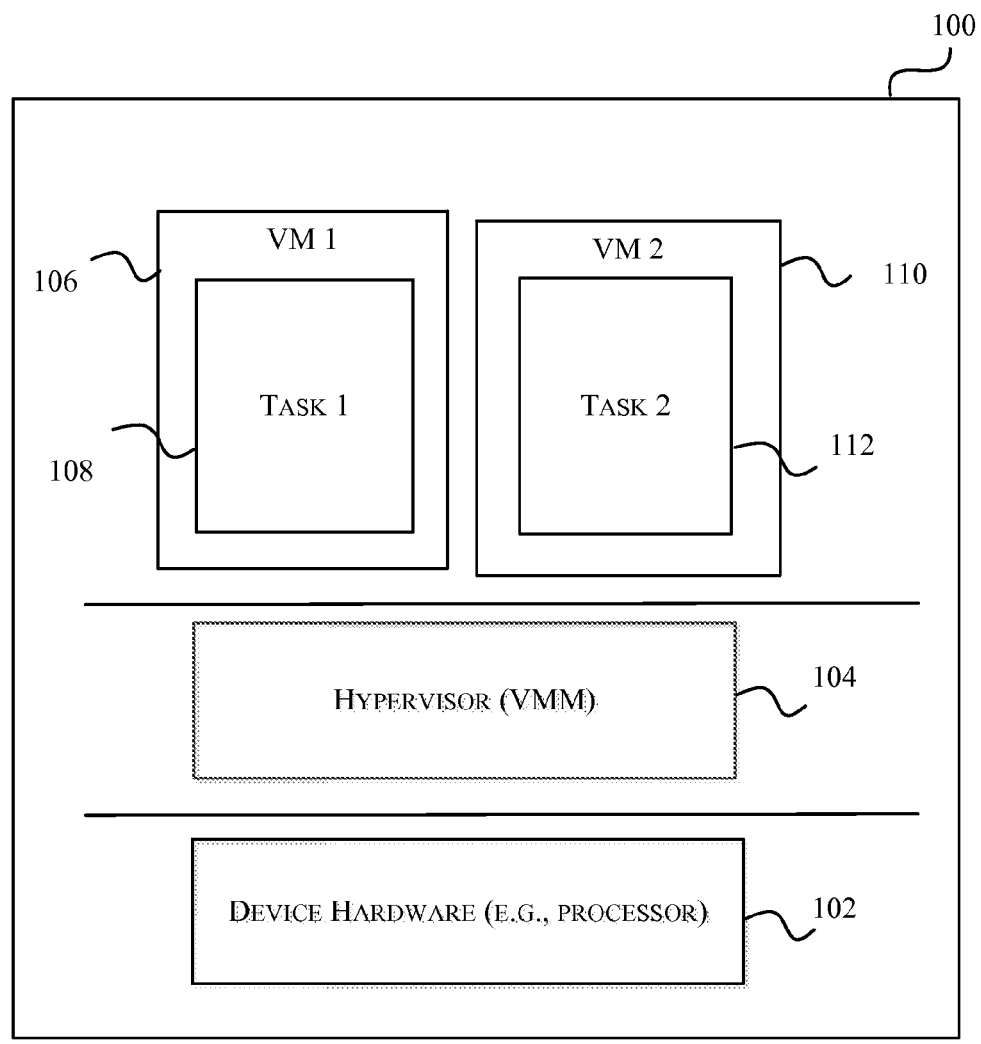
FIG. 1 illustrates an exemplary execution environment in which virtualization technology is used for performing embodiments of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques are described for allocating computing resources to tasks (or virtual machines) concurrently executing on the same computing system. In one aspect, these techniques may include allocating one or more shared hardware computing resources (e.g., processing resource, memory resource, storage resource, input/output (I/O) resource, etc.) to a task based on a service level agreement between a cloud service provider and the tenant requesting computing resources for execution of the task. In another aspect, the techniques described herein may include accumulating credits for any unused portions of an allocated computing resource, and applying the accumulated credits to obtain additional amounts of the computing resource when demanded by high workload periods during the execution of the task.

Current processing and system architectures are capable of executing a plurality of processing tasks simultaneously. These tasks may include a myriad of security sensitive tasks and non-security sensitive tasks. In addition, in some instances, malicious tasks may manage to install themselves and execute alongside security sensitive tasks.

A hardware processor may support the execution of a plurality of processing tasks simultaneously by using multiple cores and/or multi-threading. A processor may include multiple cores and/or multi-threading may provide several logical processors for simultaneously executing and completing the execution of tasks.

A multi-core processor may include multiple processing units within the same processor. In some embodiments, the multi-core processors may share certain resources, such as busses, buffers and first, second or third level of cache memories. In some instances, each core in a single or multi-core processor may also include multiple executing logical processors. Such a core that supports multiple logical processors may be referred to as a multi-threaded processor. Besides sharing higher level cache memories and busses, the tasks executing on a multi-threaded processor may also share several stages of the execution pipeline and lower level cache memories.

Therefore, in a multi-core and/or multi-threaded processor several hardware resources are shared amongst the various tasks executing on the processor. Examples of these hardware resources include several stages of the execution pipeline of a core, several temporary storage buffers, cache memories and busses. Other examples of hardware resources that can be shared by various tasks executing on the processor may include coprocessors, specialized execution units (e.g., graphical processing units (GPUs), digital signal processing units (DSPs) and/or application specific logic implemented in application specific integrated circuits (ASICs). programmable logic units (PLUs) such as field programmable gate arrays (FPGAs), etc.), memories internal or close to the processor (e.g., cache memories and their related structures), memories external to the processor (e.g., random access memories such as dynamic random access memories (DRAM)), storage resources (e.g., disk space) and input/output resources (e.g., network bandwidth).

A multi-tenant environment may refer to an environment where multiple users or accounts, each referred to as a "tenant," may be serviced simultaneously by a computing device and/or the processor of the computing device. For example, in a multi-tenant environment, a processor comprising one or more processing cores and operating in a multi-tenant environment may include one processing core that may simultaneously service instructions associated with two distinct tenants. In some instances, each tenant may be operating as part of a separate virtual machine. An example of a multi-tenant environment is a cloud computing service, where the cloud service provider may schedule the processing of tasks from different tenants (e.g., users) on the same processor, the tasks associated with a tenant may be scheduled as an instantiation of an operating environment within a virtual machine. In certain implementation, a virtual machine is an emulation of the underlying hardware. Executing tasks associated with a tenant in a virtual machine enables a processor to service multiple tenants simultaneously or near simultaneously.

FIG. 1 illustrates an exemplary execution environment in which virtualization technology is used for performing embodiments described herein. Generally, "virtualization technology" may be used for providing isolation between different operating environments sharing the same physical resources. In other words, virtualization may provide a logical abstraction of computing resources from physical constraints. One common abstraction is referred to as a virtual machine (also known as guest), or VM, which provides the content running in the VM a direct interface to the physical hardware while maintaining the abstraction. Generally, virtualization technology allows multiple VMs running on the same physical hardware to operate independently and isolated from each other. The one or more VMs on the system are managed by a Virtualized Machine Monitor, or VMM (also known as hypervisor or host). The VMM is a software or firmware layer responsible for hosting and managing VMs. The VMM usually executes at a higher privilege level than the VMs and manages the system's processor and memory, and allocates other resources for each VM.

FIG. 1 illustrates device hardware 102 executing VMM 104. VMM 104 manages a first VM 106 (VM1) and a second VM 110 (VM2). Additional VMs not specifically shown may also be managed by VMM 104. Device hardware 102 may include one or more processors besides other components for operating a computing system, as described in further detail in FIG. 14 and FIG. 15. In certain implementations, the processors may include hardware support for virtualization technology. For example, INTEL and AMD brand processors provide hardware hooks that support virtualization technology. Qualcomm Incorporated also provides a software abstraction layer which enables multiple operating systems and other clients to execute concurrently on a single processor, through the virtualization and portioning of physical hardware resources. As described above, certain processors may be architected to share hardware resources when possible, for more efficiently utilizing certain hardware components. For example, multiple processing cores may share caches and certain busses on the processor. Furthermore, in some implementations, multiple execution threads may operate on the same thread sharing the execution pipeline and level 1 and level 2 caches.

In FIG. 1, VMM 104 manages VM1 106 executing a first task 108 and VM2 110 executing a second task 112. In some instances, instructions from the first task 108 and the second task 112 may be executing simultaneously. Simultaneously executing two tasks may include concurrently processing at least one executable instruction belonging to the first task 108 and at least another executable instruction belonging to the second task 112, where neither of the instructions belonging to the first task and the second task has completed execution. In some embodiments, a task may refer to a group of executable instructions. Example of a task may include a processing thread, a process, or an application that may include multiple processes.

Figure 2:
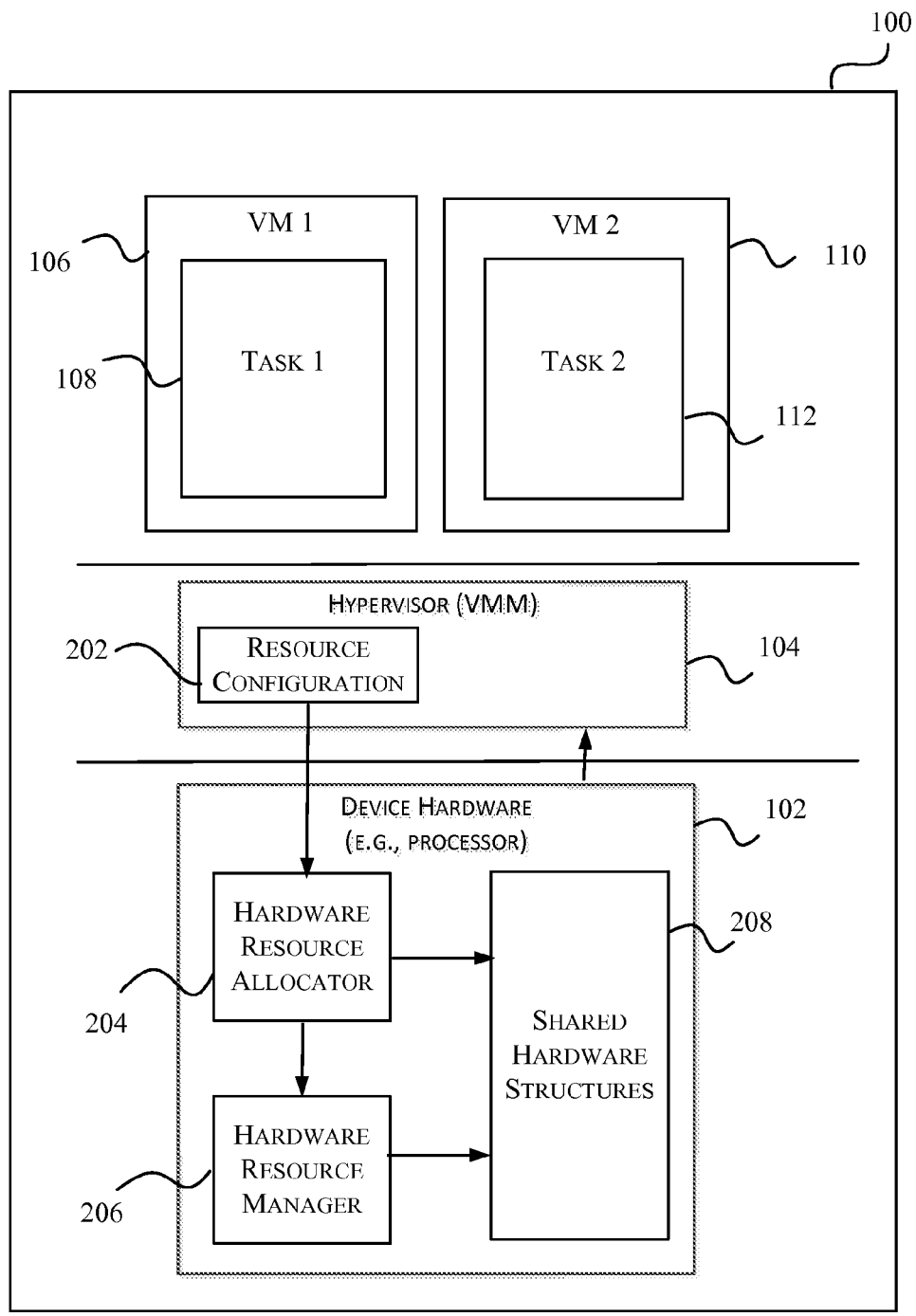
FIG. 2 illustrates a variation of an exemplary execution environment shown in FIG. 1 that is configured to allocate dedicated resources from shared hardware resources to a virtual machine.

FIG. 2 illustrates a variation of the exemplary execution environment shown in FIG. 1 that is configured to allocate dedicated resources from shared hardware resources to a virtual machine. FIG. 2 shows a resource configuration module 202, hardware resource allocation module 204, hardware resource manager module 206 and shared hardware structures 208. In one implementation, the resource configuration module 202 may be implemented in VMM 104 and the hardware resource allocation module 204, hardware resource manager module 206 and shared hardware structures 208 may be implemented in the processor (e.g., hardware and/or microcode).

In certain implementations, the resource configuration module 202 may configure the underlying hardware to associate certain portions of the shared hardware structures 208 with a specific VM. For example, in one implementation, the resource configuration module 202 may request dedicated resources for VM 110 (VM 2) from the shared hardware structures. The resource configuration module 202 may allow VMM 104 to activate and deactivate dedicated allocation of a portion of the shared hardware resources for one or more VMs. The resource configuration module 202 may provide different levels of granularity of control to the VMM 104. For example, the resource configuration module 202 may allow VMM 104 to enable dynamic and automatic allocation of resources that may be provided by the hardware resource allocator module 204 based on the number of VMs sharing the resource, the number of shared resources, or in some embodiments, based on respective service level agreements with the tenants associated with the VMs, etc. For example, for two VMs executing on a processing core, the hardware resource allocator module 204 may allocate portions of the shared hardware structures 208 differently based on the service level agreement that each tenant has established with the cloud computing service provider. In some embodiments, VMM 104 may configure the resource configuration module 202 such that VMM 104 overrides or dictates the fine grained policy for each shared hardware resource 208. Exemplary details of resource configuration module 202 are described with reference to FIG. 6 further below.

The hardware resource allocator module 204 may allocate or associate certain resources to specific virtual machines. The hardware resource allocator module 204 may use the resource configuration module 202 with specific configurations (e.g., based on service level agreements with the tenants), overrides or hints set by the VMM 104, to allocate or associate portions of the shared hardware resources. In some instances, the hardware resource allocator module 204 may automatically and dynamically allocate and associate portions of the shared hardware structures 208 for the VMs executing on the processor. For example, the dynamic and automatic allocation of resources may be different for each VMs. In some instances, the hardware resource allocator module 204 may reconfigure resources associated with a particular VM in runtime to accommodate the changing workloads of the VMs and various processing load demands for the processor.

In some embodiments, the hardware resource allocator module 204 may assign an identifier (may be referred to, for example, as a task identifier (ID) or VM ID) to the virtual machine from the plurality of virtual machines and associate a portion of the hardware resource with the first identifier. Exemplary details of resource configuration module 202 are described with reference to FIG. 4 further below.

Figure 10:
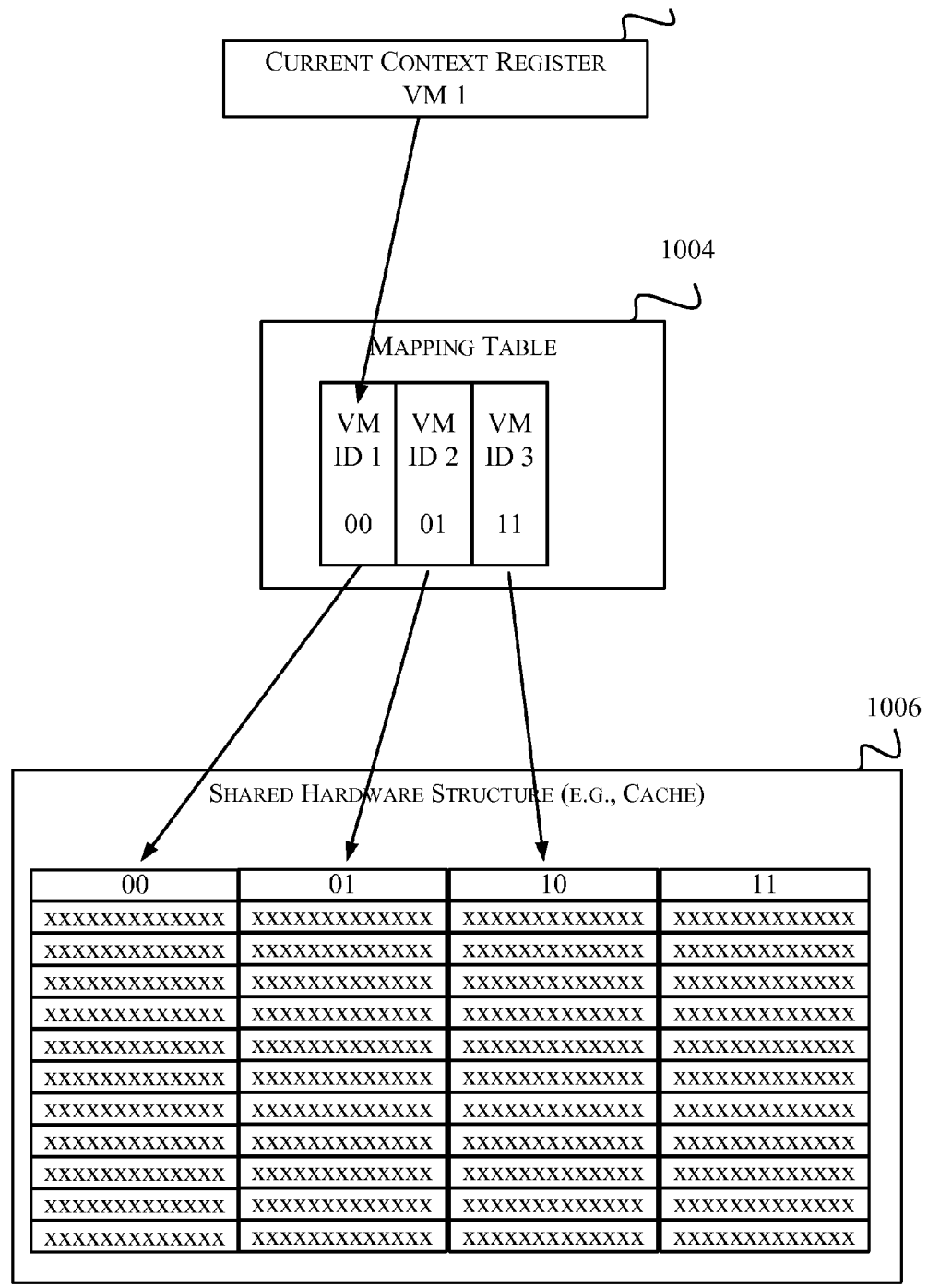
FIG. 10 illustrates another exemplary implementation of a shared hardware structure, according to certain embodiments of the disclosure.
Figure 11:
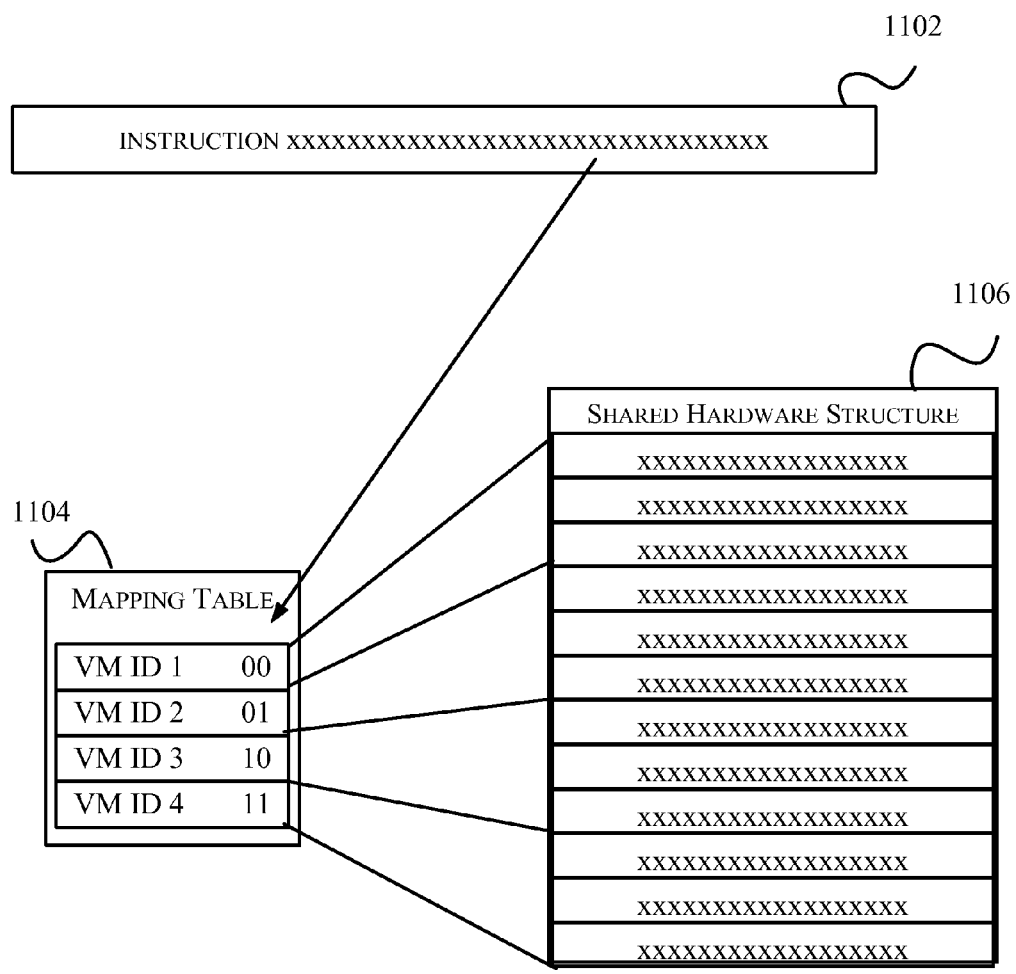
FIG. 11 illustrates another exemplary implementation of a shared hardware resource, according to certain embodiments of the disclosure.

The hardware resource manager module 206 may manage allocation of the shared hardware structures 208 by using one or more mapping tables (as shown in FIG. 10 and FIG. 11). The mapping table may provide the mapping between the VMs and the particular shared hardware resources from the shared hardware structures 208. The hardware resource manager module 206 may maintain and use such mapping tables for providing active allocation control. During execution, the hardware resource manager module 206 may provide the appropriate mapping for resource allocation for the VMs. In addition, the hardware resource manager module 206 may also provide certain hardware implemented (e.g., microcode) handlers for handling active allocation management of resources during execution of computer executable instructions belonging to a particular VM.

Multiple techniques for allocating various portions of each hardware resource may be used individually or in combination of each other. In certain implementations, the resource configuration module 202 may configure the policy to be used by the hardware resource manager module 206 to allocate the hardware resources. For example, the policy can be set based on service level agreements. In some embodiments, allocation dedicated caches, buffers or other resources for a VM may be handled by the hardware resource manager module 206, without exiting or transferring control to the VMM 104, thus maintaining high level of performance for the computing device. Although shown as one module in the figures for ease of illustration, the shared hardware structures 208 may be dispersed throughout the processor and/or the computing system. Shared hardware structures 208 may include hardware resources such as one or more of a Level 1 cache, a Level 2 cache, a Level 3 cache, Translation Lookaside Buffer (TLB), Write Combining Buffer, Branch Prediction Table, Branch Target Buffer, processor cycles, specialized execution units, memories such as DRAMs external to the processor, storage resources such as disk space and input/output resources such as network interface units.

Although, hardware structures are discussed throughout the disclosure, in some embodiments, access to temporal hardware resources, such as processor cycles, processor instruction priorities, memory bus accesses, cache accesses, I/O accesses, and network accesses may also be allocated using techniques described herein. For example, certain VMs may be assigned time-slices for accessing certain shared temporal resources. In some instances, small random delays may be introduced in the access patterns, such that the distribution of access times may be dependent on other VMs. Alternatively, the temporal hardware resource may be time-division multiplexed, such that a given VM has a predictable pattern of time slots, no matter what the other VMs are doing.

Figure 3:
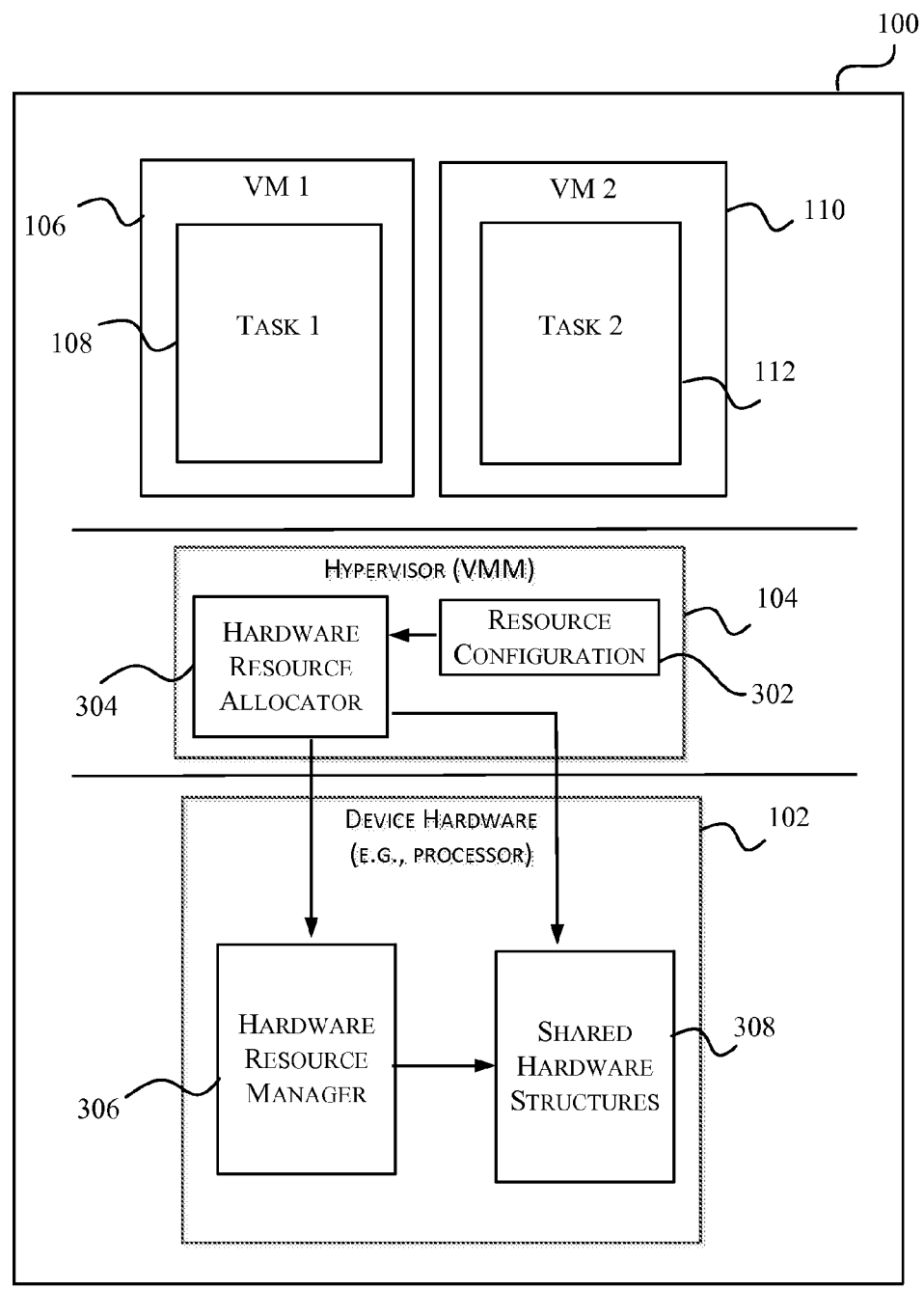
FIG. 3 illustrates another variation of an exemplary execution environment shown in FIG. 1 that is configured to allocate dedicated resources from shared hardware resources to a virtual machine.

FIG. 3 illustrates another variation of the exemplary execution environment shown in FIG. 1 that is configured to allocate dedicated resources from shared hardware resources to a virtual machine. As shown in FIG. 3, at least a portion or all of the hardware resource allocator module 304 may be implemented in the VMM 104, rather than in the device hardware 102. Similar to what has been described with reference to FIG. 2, the allocation controls for resources for the VMs may be configured by VMM 104 via the resource configuration module 302. The hardware resource allocator module 304 may receive input from the resource configuration module 302 to allocate and/or associate the VMs with specific portions of the shared hardware structures 308. The resource configuration module 302 may be similar to the resource configuration module 202 of FIG. 2, with a few variations for interacting with the hardware resource allocator module 304 implemented in the VMM 104. Exemplary details of resource configuration module 302 are described with reference to FIG. 6 further below.

Implementing the hardware resource allocator module 304 in the VMM 104 may allow the user or the VMM 104 vendor with greater control of how the shared hardware structures 208 are configured and allocated. For example, different variations of the hardware resource allocator module 304 may be provided for different uses cases. For instance, the hardware resource allocator module 304 may be different for a VMM 104 executing on a cloud service provider server rather than the hardware allocator module 304 for a VMM 104 executing on a workstation computer in an office. Exemplary details of hardware resource allocator module 304 are described with reference to FIG. 4 further below.

Similarly, the hardware resource manager module 306 and the shared hardware structures 308 may be functionally similar to the hardware resource manager module 206 and the shared hardware structures 208. However, the hardware resource manager module 306 and the shared hardware structures 308 may be different, in that they may expose an interface to the VMM 104 for directly interacting and configuring portions of the respective modules. Exemplary details of the hardware resource manager module 306 are described with reference to FIG. 5.

Figure 4:
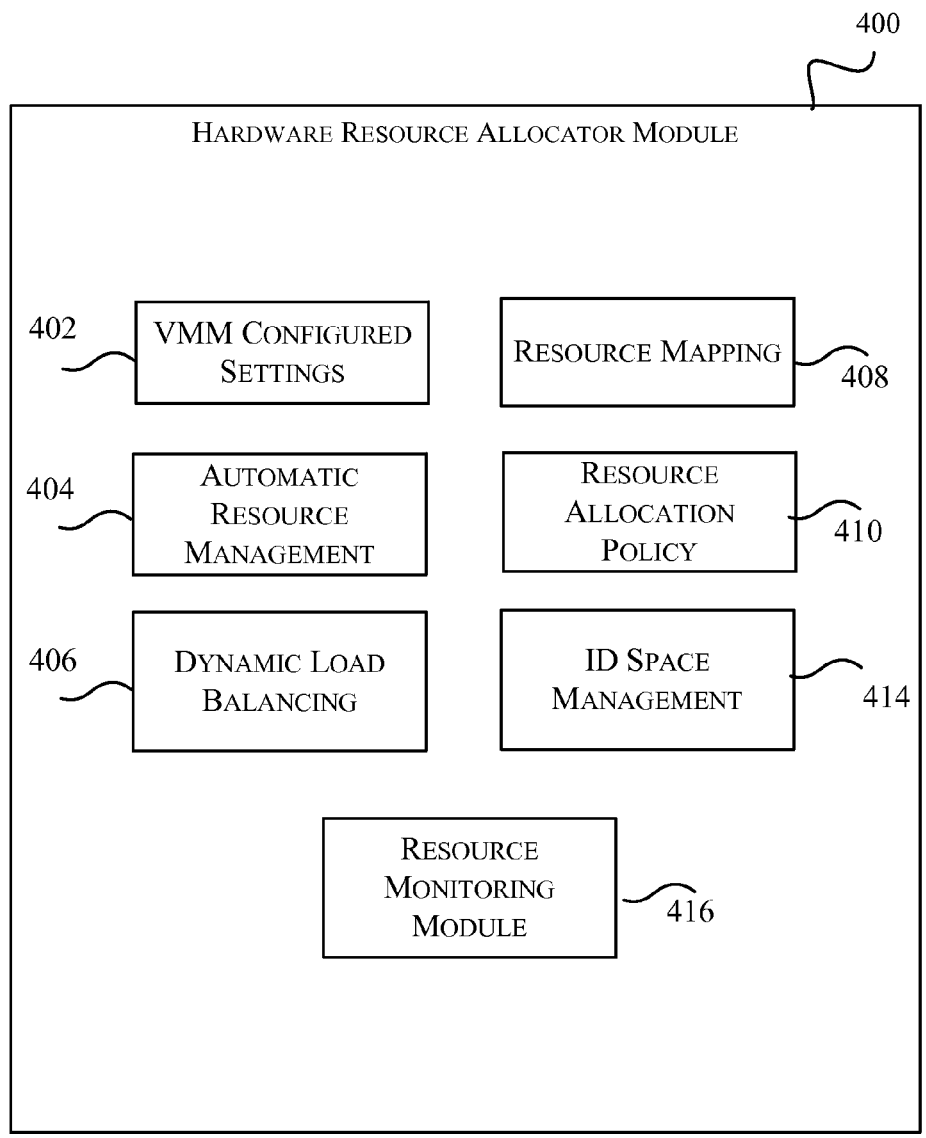
FIG. 4 is a block diagram illustrating exemplary aspects of a hardware resource allocation module, according to certain embodiments of the disclosure.

FIG. 4 is a block diagram illustrating exemplary aspects of the hardware resource allocation module, according to some embodiments of the disclosure. Hardware resource allocation module 500 may be implemented as the hardware resource allocation module 204 in FIG. 2 or the hardware resource allocation module 304 in FIG. 3, or any combination thereof. Furthermore, VMM configured settings module 402, automatic resource management module 404, dynamic load balancing module 406, resource mapping module 408, resource allocation policy module 410, ID space management module 414 and resource monitoring module 416 may be implemented in hardware, software, firmware (e.g., processor microcode) or any combination thereof.

The hardware resource allocator module 400 may appropriately allocate or associate certain hardware resources, such as portions of the shared hardware structures 208 with specific VMs. The hardware resource allocator module 204 may use specific configurations (e.g., set based on service level agreements), overrides or hints provided by the VMM 104 with the resource configuration module 600 to allocate or associate portions of the shared hardware resources. In some instances, the hardware resource allocator module 400 may automatically and dynamically allocate and associate the shared hardware resources for the VMs executing on the processor. For example, the hardware resource allocator module 400 may reconfigure resources associated with a particular VM in runtime to accommodate for changing workload of a task, the number of active VMs or tasks associated with the processor.

Figure 6:
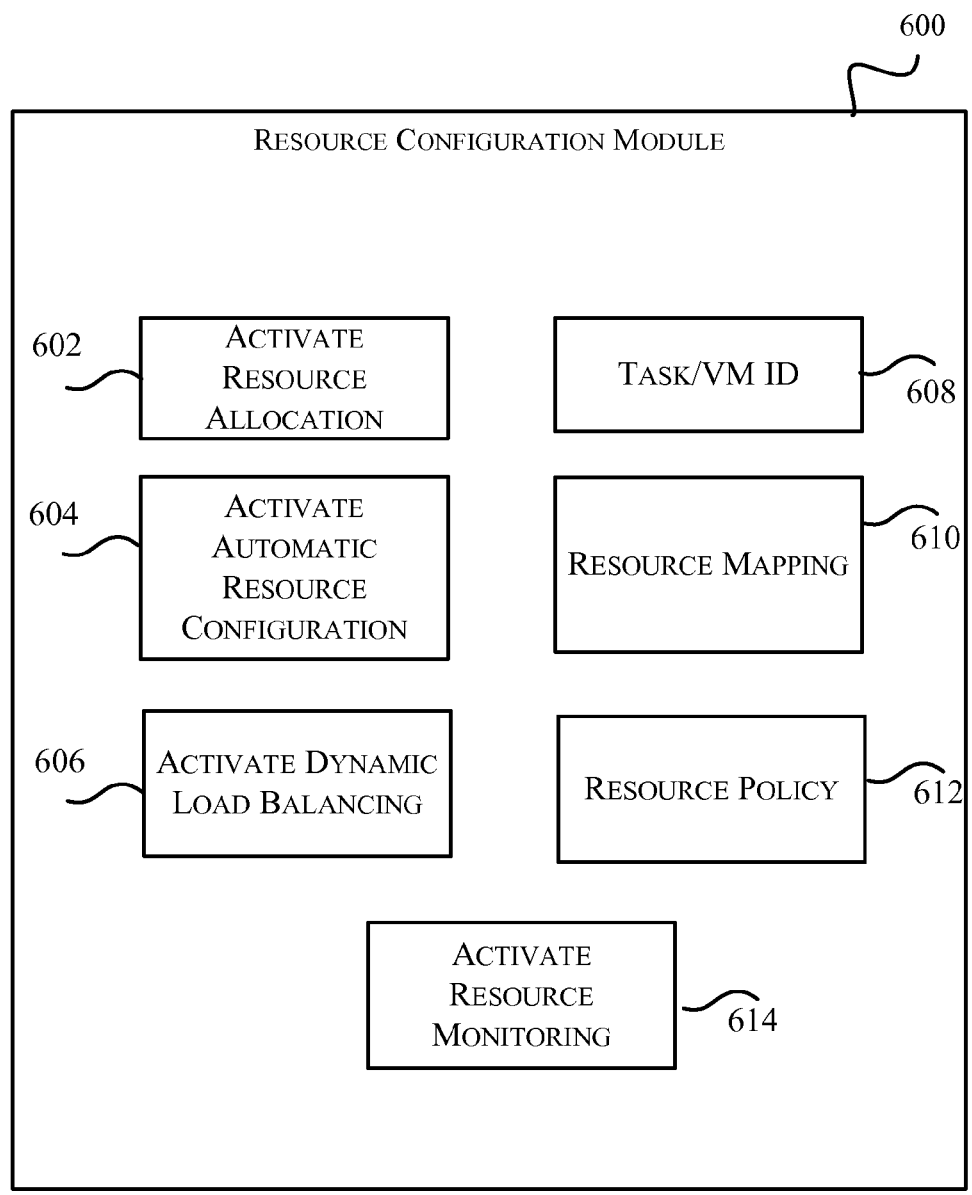
FIG. 6 is a block diagram illustrating exemplary aspects of a resource configuration module, according to certain embodiments of the disclosure.

The hardware resource allocator module 400 may receive values (e.g., resource credits) from resource configuration module described in further detail in FIG. 6 at the VMM configured settings module 402. The configurations received at the VMM configured settings module 402 may activate resource allocation features and determine or override several features or configurations for the hardware resource allocator module 400. The VMM configuration settings module 402 may disseminate the different configuration values received from the resource configuration module 600 (via VMM 104) to the appropriate modules in the hardware resource allocator module 400. In some instances, the configuration values from the resource configuration module may be received via hardware registers, memory locations or memory pointers by the VMM configured settings module 402 in the hardware resource allocator module 400.

Automatic resource management module 404 may allow for automatic resource configuration and allocation of shared hardware resource based on example considerations such as service level agreements, workload of a task, the number of VMs, resources available, etc. In some instances, the resource configuration module described in further detail in FIG. 6 may activate the automatic resource management module 404. In other implementations, the automatic resource management module 404 may be activated to automatically configure the resources associated with VMs once the resource allocation features are enabled. If the functions performed by the automatic resource management module 404 are deactivated by the resource configuration module 600, the VMM 104 may manually reconfigure and associate certain VMs with certain resources associated with certain portions of the shared resources using configuration options in the resource configuration module 600.

Dynamic load balancing module 406 may dynamically rebalance the resources associated with any particular VM. For example, a processing core may be enabled to run two VMs at a first time. In such a scenario, according to some embodiments, the first VM may be allocated one/third the resources of a shared hardware structure, such as a cache and the second VM may be allocated one/third the resources of the shared hardware structure, leaving about one/third of the shared hardware structure as a resource for the VMM and other miscellaneous tasks. However, if at a later point in time the total number of VMs increase to four VMs from two VMs, the device hardware 102 may be configured to dynamically load balance the usage of the shared hardware resources 208/308. For example, the allocation of the shared hardware structure for the first VM may go down from one/third of the shared hardware structure to one/fifth to accommodate for the additional VMs. In some embodiments, dynamic load balancing module 406 may throttle the resources associated with each task based on their demands, resources available, service level agreements or combinations thereof.

In certain implementations, dynamic load balancing may be performed for both active VMs and VMs that are not currently active but are scheduled for execution on the processing core. In other implementations, dynamic load balancing may be performed only for active VMs executing on a processing core. For example, in some embodiments, where a processing core may have multiple processing threads executing simultaneously on the same processing core and sharing hardware structures, such as caches, embodiments described herein may appropriately allocate resources for each of the active VMs associated with each of the currently executing processing threads. In other implementations, each processing thread of each processing core may maintain several active VMs and their cached state for fast switching between multiple VMs and therefore may be configured to enable dynamic load balancing using the dynamic load balancing module 406.

Resource mapping module 408 may be configured to generate a mapping or indication for the mapping of the VMs to certain portions of the shared hardware structures 208/308. For example, in FIGS. 1-3, for VM 110 (VM 2), executing a task 112, the VMM 104 may indicate to the underlying hardware to reserve a first way of a cache for VM 110 (VM 2), such that all cache access performed by the VM 110 (VM 2) are serviced by the first way of the cache. As another example, VMM 104 may indicate to the underlying hardware to reserve a coprocessor for execution of task 112.

The ID space management module 414 may manage the usage of the VM IDs in a system where a mapping may exist between the VMs and the shared hardware resources. In a multi-socket or multi-core system, the ID space management module 414 may use a large enough address space, such that the invalidation of a used VM ID may be deferred for a significantly long period to avoid frequent interprocessor interrupts to invalidate VM IDs and synchronize the ID space amongst multiple sockets. This may allow amortization of the time cost associated with synchronizing the VM ID set amongst the various processing entities on the system.

In some instances, the ID space management module 414 may assign an identifier to a portion of the hardware resource and associate or provide a mapping between the VM ID of the VM and the portion of the shared hardware structure 208. In other implementations, ID management module 414 may directly tag the portion of the hardware resource with the VM ID.

The hardware resource allocator module 400 may also implement a resource monitoring module 416. The resource monitoring module 416 may enable the underlying hardware for monitoring overall consumption of resources by any particular VM or task. The resource monitoring module 416 may configure certain performance counters provided by the device hardware 102. In some embodiments, the resource monitoring module 416 may activate resource allocation and initiate automatic or pre-configured allocation of resources based on the service level agreement, resource consumption or events monitored for a specific VM.

Figure 5:
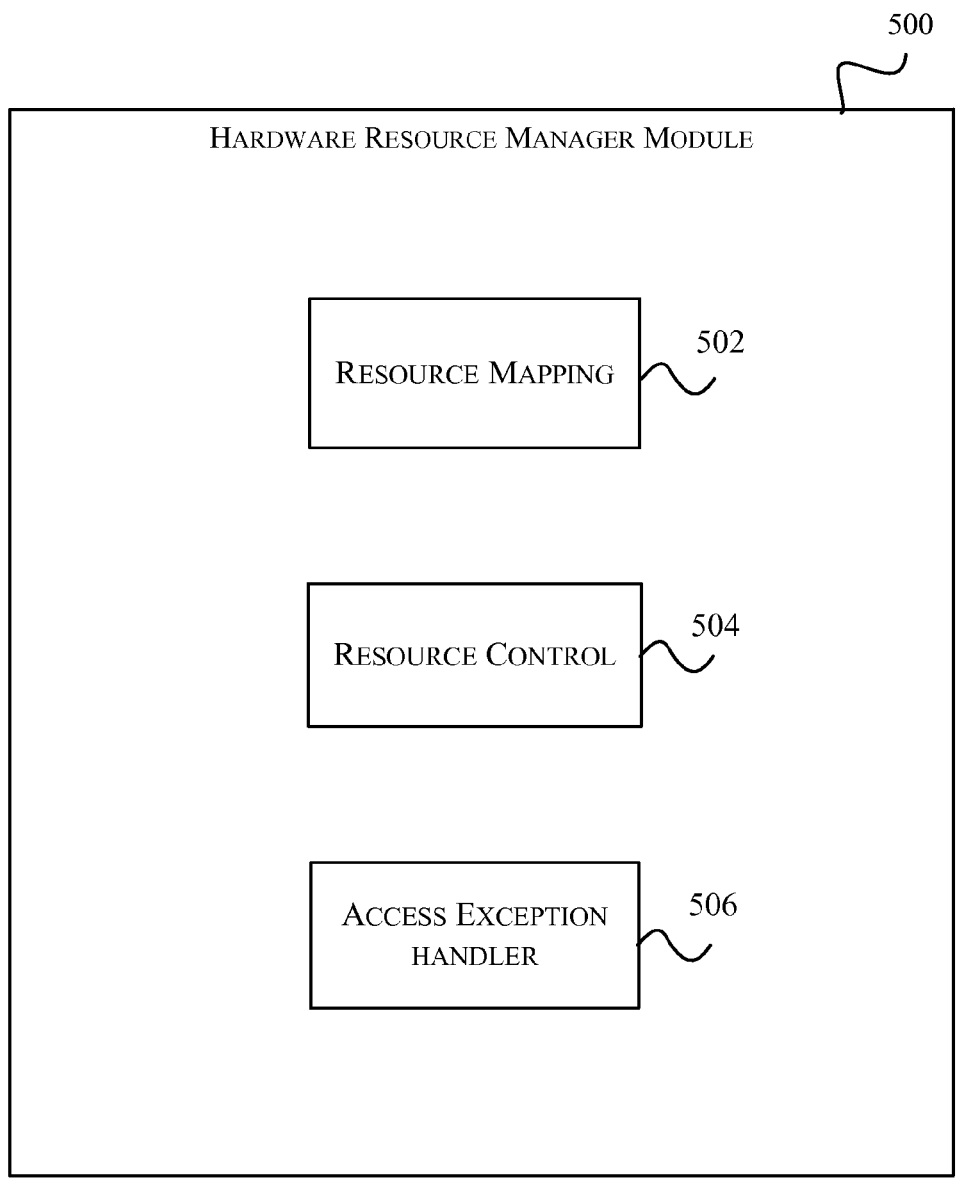
FIG. 5 is a block diagram illustrating exemplary aspects of a hardware resource manager module, according to certain embodiments of the disclosure.

FIG. 5 is a block diagram illustrating exemplary aspects of the hardware resource manager module, according to certain embodiments of the disclosure. Hardware resource manager module 500 may be implemented as the hardware resource manager module 206 in FIG. 2 or the hardware resource allocation module 306 in FIG. 3, or any combination thereof. Furthermore, allocation mapping module 502, allocation control 504 and access exception handler 506 may be implemented in hardware, software, firmware (e.g., processor microcode) or any combination thereof.

Allocation mapping module 502 may maintain one or more mapping tables (as shown in FIG. 10 and FIG. 11) accessible by the hardware resource manager module 206. The mapping tables may associate the VM IDs (may also be referred to as task IDs) and portions of the particular shared hardware resources from the shared hardware structures 208/308. In some implementations, allocation mapping module 502 may maintain the mapping tables in system memory. In other implementations, allocation mapping module 502 may cache some or all of the entries from the mapping tables in the processor for fast access by components of the hardware resource manager module 206, such as the allocation control module 504.

In some instances, the access control module 504 may manage access to the shared hardware structures 208/308 using information stored and maintained by the access mapping module 502. During execution of instructions from the various VMs the access control module 504 may provide the appropriate mapping for access request based on the originating VM for the computer executable instruction making the request.

In some implementations, allocation control module 504 may allow or restrict access for computer executable instructions executed from the VM to the portion of the hardware resource from the shared hardware structures 208/308 associated with an VM identifier. Allocation control module 504 may also restrict access to the portion of the hardware resource associated with the VM identifier such that the computer executable instructions executed from the virtual machine can only access the portion of the shared hardware resource associated with the VM identifier. In some implementations, allocation control module 504 may restrict access to the portion of the shared hardware resource associated with the VM identifier such that the computer executable instructions executed from the virtual machine cannot access the portion of the hardware resource associated with VM identifier from the hardware resource.

Multiple techniques for restricting access to various portions of each hardware resource may be used individually or in combination with each other. In certain implementations, the resource configuration module 202 may configure the policy to be used for resource allocation by allocation control module 504.

Access exception handler 506 may provide certain hardware implemented (e.g., microcode) handlers for handling access restriction of resources during the execution of instructions belonging to a particular VM. In some instances, access exception handler 506 may transfer control to the VMM 104 for a VM operation and provide the VMM 104 with additional information regarding the access request by the VM.

FIG. 6 is a block diagram illustrating exemplary aspects of the resource configuration module, according to certain embodiments of the disclosure. Resource configuration module 600 may be implemented as part of VMM 104, as discussed with reference to FIG. 2 and FIG. 3. In certain instances, even though the resource configuration module may be implemented as part of the VMM 104, the resource configuration module 400 may access certain hardware resources, such as configuration registers provided by the device hardware 102, such as the processor (hardware or microcode), or any combination thereof.

Furthermore, activate resource allocation module 602, activate automatic resource configuration module 604, activate dynamic load balancing 606, task/VM ID module 608, resource mapping module 610, restriction policy module 612 and activate resource monitoring module 614 may all be implemented in software or in conjunction with certain features implemented in hardware, software, firmware (e.g., processor microcode) or any combination thereof. Resource configuration module 600, using one or more modules above, may provide the configuration for allocating resources to a VM from a shared hardware structure 208/308.

In some implementations, the resource configuration module 600 may provide an interface for programming mechanisms, features and configurations provided by several modules and components of the processor (hardware or microcode), such as the hardware resource allocator module 400 and the hardware resource manager module 500. For example, in one implementation, the processor may provide the configuration registers for enabling/disabling dynamic allocation of shared hardware resources, performance monitoring of certain tasks/VMs, dynamic load balancing, etc. in VMM 104 for programming such configuration parameters.

In some implementations, the resource configuration module 600 may configure the underlying hardware to associate certain portions of the shared hardware structures 208/308 with a specific VM. For example, the resource configuration module 600 may request dedicated resources for VM 110 (VM 2), e.g., based on a service level agreement. The resource configuration module 600 may provide different levels of granularity of control to the VMM 104 for controlling the allocation of resources to specific VMs.

Activate resource allocation module 602 may activate or deactivate the resource allocation feature. Activate resource allocation module 602 may provide a combination of settings to activate or deactivate the resource allocation feature globally for the processor, and/or for per core, per thread, per task and/or per VM basis. For example, activate resource allocation module 602 may set one or more activate bits in one or more configuration registers provided by the processor to activate the allocate resource feature and clear the one or more activate bits to deactivate the allocate resource feature. Several such configuration bits may be provided for activating or deactivating the resource allocation feature on various different granularities.

Activate automatic resource configuration module 604 may provide the automatic resource management module 404 implemented as part of the hardware resource allocator module 400 a hint to allow for automatic resource configuration and allocation of shared hardware resource, based on example considerations such as service level agreement, workload of a task, the number of VMs and resources available. In instances where the VMM 104 may disable automatic resource configuration in the activate automatic resource configuration module 604, VMM 104 may provide the resource mapping using the resource mapping module 610 and the restriction policy module 612 in the hardware resource allocator module 600.

Activate dynamic load balancing module 606 may provide the dynamic load balancing module 406 implemented as part of the hardware resource allocator module 400 a hint to allow for dynamic load balancing of shared hardware resources. Dynamic load balancing, as described in FIG. 4, may allow for rebalancing of resources associated with the VM based on the changing processing demands for the computing system.

In certain aspects, Task/VM ID module 608 may identify the task and/or VM for which to activate the resource allocation feature. For example, referring to FIGS. 1-3, VMM 104 may configure Task/VM ID module 608 to identify and activate the resource allocation feature for VM 110 (VM 2). The determination of activating the resource allocation feature may be based on a service level agreement associated with the tenant of any particular VM. For instance, VMM 104 may choose to activate the resource allocation feature for a certain number of banks of DRAMs to VM 110 (VM2) under a service level agreement with the tenant or user of VM 110 (VM 2).

In some implementations, a group ID may be used by the Task/VM ID module 608 for identifying and activating the resource allocation feature for a pluarlity of VMs or Tasks. For example, in one implementation, a mask may be used to select a group of VMs or Tasks.

In some implementations, where automatic resource configuration 604 may be deactivated, the resource mapping module 610 may be configured to provide the VMM 104 with an interface for providing a mapping or indication for the mapping of the VMs to certain portions of the shared hardware structures 208/308. Changes to the mapping by the resource mapping module may result in updates to the allocation mapping module 502 in the hardware resource manager module 500.

In some aspects, the restriction policy module 612 may provide policy for the allocation restrictions associated with shared hardware resources for any VM. For example, in one implementation, a specific portion of the shared hardware structure may be restricted from being associated with a specific VM ID (via resource mapping module). For example, if access to a specialized execution unit is not part of a service level agreement associate with a particular VM, the VM may be restricted from using the specialized execution unit. In some instances, the allocation policy for the restrictions selected in the restriction policy module 612 may update the allocation control module 504 in the hardware resource manager module 500.

In some aspects, the resource configuration module 600 may allow VMM 104 to activate resource monitoring via the activate resource monitoring module 614. The activate resource monitoring module 614 may activate resource monitoring using performance monitors in the resource monitoring module 416 in the hardware resource allocation module 400. Activating resource monitoring may enable the underlying hardware to monitor consumption or gather information regarding specific events for the resource consumption by any particular VM or task and appropriately take action for misbehaving VMs or tasks.

Figure 7:
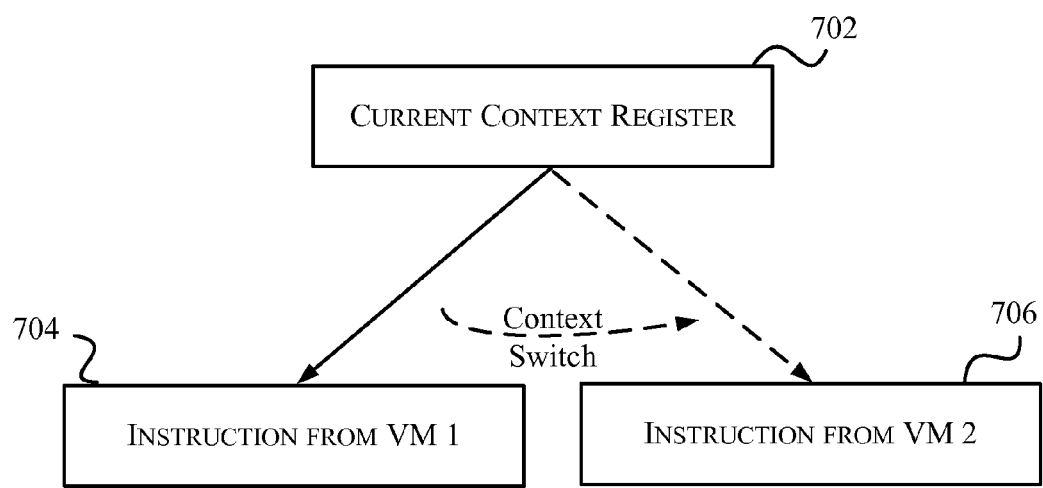
FIG. 7 is a block diagram illustrating an exemplary implementation of associating context with a computer executable instruction, according to certain embodiments of the disclosure.

FIG. 7 is a block diagram illustrating an exemplary implementation of associating context with a computer executable instruction, according to certain embodiments. As described herein, the allocation control policies for an instruction belonging to a first VM 704 may be different from the allocation control policies for an instruction belonging to a second VM 706. In one implementation, the mapping or association of the VM with portions of the shared hardware structure 208 may be based on the mappings maintained by the allocation mapping module 502 of the hardware resource manager module 500. The allocation control policy may be reflected in the allocation control module 504 of the hardware resource manager module 500.

As shown in FIG. 7, in one implementation, the processor may maintain the current context associated with the active VM in a current context register 702. In some implementations, the current context may be maintained for each processing thread on the processor. The current context register 702 may associate the executing instructions for the processing thread or core with an active VM. In some implementations, based on the contents of the current context register 702, the allocation control module or the shared hardware structure 208 may restrict/allow access to certain portions of the shared hardware structures 208, using techniques described herein.

In certain implementations, switching the execution between one VM to another VM may be implemented as a serializing event, such that all computer executable instructions before the switch occurs (i.e., all the instructions belonging to the VM prior to the switch) are completed and/or flushed from the processor pipeline before the new instructions from the newly loaded VM start executing. Implementing the VM switch as a serializing event ensures that instructions from the VM after the VM switch do not gain access to the shared hardware resources associated with the VM prior to the VM switch.

Figure 8:
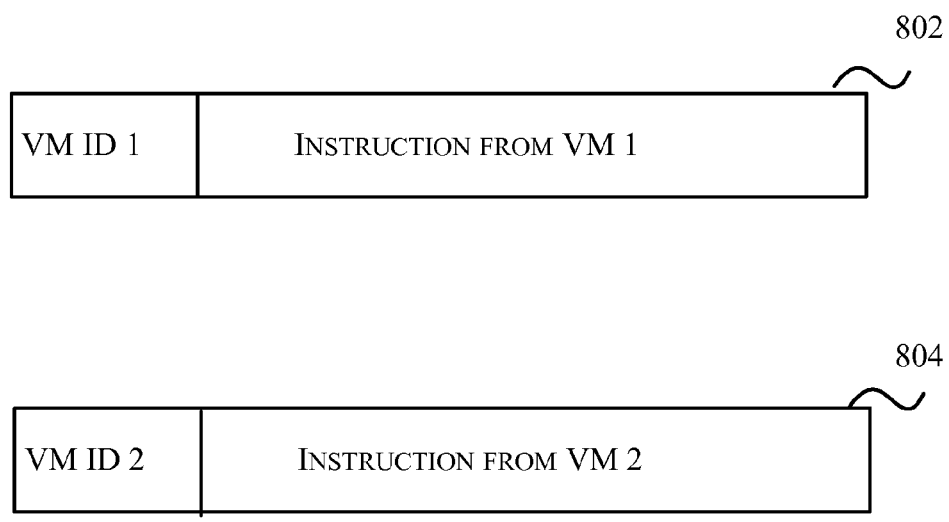
FIG. 8 is another block diagram illustrating an exemplary implementation of associating context with a computer executable instruction, according to certain embodiments of the disclosure.

FIG. 8 is another block diagram illustrating an exemplary implementation of associating context with a computer executable instruction, according to some embodiments. As shown in FIG. 8, each instruction may be tagged with the VM ID that the computer executable instruction is associated with. For example, as shown in block 802, the instruction from the VM 106 may be tagged with VM ID 1, and as shown in block 804, the instruction from the VM 110 may be tagged with VM ID 2. In certain implementations, the instructions may be tagged at any of various stages of the processor pipeline, such as fetch and/or decode stages of the processing pipeline.

In some implementations, the shared hardware structure 208/308 may include logic to check if a portion of the shared hardware structure is associated with the VM ID tagged to the computer executable instruction requesting information. In some implementations, the access control module 504 may determine the access restrictions for a given instruction based on the tag associated with the instruction.

In some implementations, a combination of techniques may be used in determining the VM an instruction belongs to for the purposes of allowing access to certain portions of a shared hardware structure 208/308. In one example scenario, as described in FIG. 7, the current context register 702 may provide the VM association for the instructions. However, for certain instructions with long latencies, the processor may tag the instruction with the VM ID and allow the instruction to continue completion even after the serializing event (i.e., switch from one VM to another VM).

FIG. 9 illustrates an exemplary implementation of a shared hardware structure, according to some embodiments. The shared hardware structure 900 from FIG. 9 may represent one implementation of the shared hardware structures (208 and 308) represented in FIG. 2 and FIG. 3. In FIG. 9 several lines of data are depicted, wherein each data line is tagged with a VM ID. For example, in FIG. 9, some of the lines are tagged with VM ID 1 and others are tagged with VM ID 2. In one implementation, the shared hardware structure may have logic for determining the VM that the access request belongs to. For example, the checking logic in the shared hardware structure 900 may check the current context register 702 (as described in FIG. 7) or the tag associated with the access request (as described in FIG. 8) to determine the VM from which the access request originates. In one implementation, under a specific access policy, if the access request originates from a VM with VM ID 1 to access a line tagged with VM ID 1, the access to the line may be granted. On the other hand, if the access request originates from a VM with VM ID 1 to access a line tagged with VM ID 2, the access to the line may be denied. In some implementations, an access exception may be generated in response to an invalid or illegal access request and handled by the access exception module 506 of the hardware resource manager module 500.

FIG. 10 illustrates an exemplary implementation of a shared hardware structure, according to some embodiments. The shared hardware structure 1000 from FIG. 10 may represent one implementation of the shared hardware structures (208 and 308) represented in FIG. 2 and FIG. 3. FIG. 10 illustrates an example shared hardware structure, such as a 4-way cache 1006. Generally, an access request for a line in the cache 1006 may result in an access to a line residing at any one of the ways of the cache, based on the cache eviction policy. In some aspects of the disclosure, certain ways of the cache may be reserved for specific VMs.

In some implementations, the VMM 104, via the resource configuration module 600, may request resource allocation and management for the VM 110 (VM 2). In some implementations, the resource mapping module 408 may generate the mapping for the VM, using a mapping table 1004. In some aspects, mapping table 1004 may be maintained by the allocation mapping module 502 of the hardware resource manager module 500.

As shown in FIG. 10, the allocation control module 504 may use the current context register 702 in determining the current executing VM and associate the reserved way of the cache that may be used by the computer executable instructions executing in the current context. In some implementations, the current context may be cached in the shared hardware structure or a temporary buffer quickly accessible to the shared hardware structure. As shown in FIG. 10, the current context register 702 may have a VM ID for the VM 106 (VM 1) that may translate to the first way of the cache 1006, using the mapping table 1004.

FIG. 11 illustrates another exemplary implementation of a shared hardware resource, according to certain embodiments of the disclosure. The shared hardware structure 1100 from FIG. 11 may represent one implementation of the shared hardware structures (208 and 308) represented in FIG. 2 and FIG. 3. For example, the shared hardware structure may be a branch prediction buffer, or a table lookaside buffer or any other buffer. In some implementations, a computer executable instruction accessing shared hardware structure 1106 and originating from a VM may be associated with a portion of the shared hardware structure using a mapping table 1104. The mapping table may associate the VM ID with a secondary ID that may be used to statically or semi-statically segment the shared hardware structure 1106 into multiple portions. As discussed previously, the current context for the VM may be accessed from the current context register 702 or a tag associated with the computer executable instruction or any other suitable method. The mapping table may be maintained by the allocation mapping module 502 of the hardware resource manager module 500.

Figure 12:
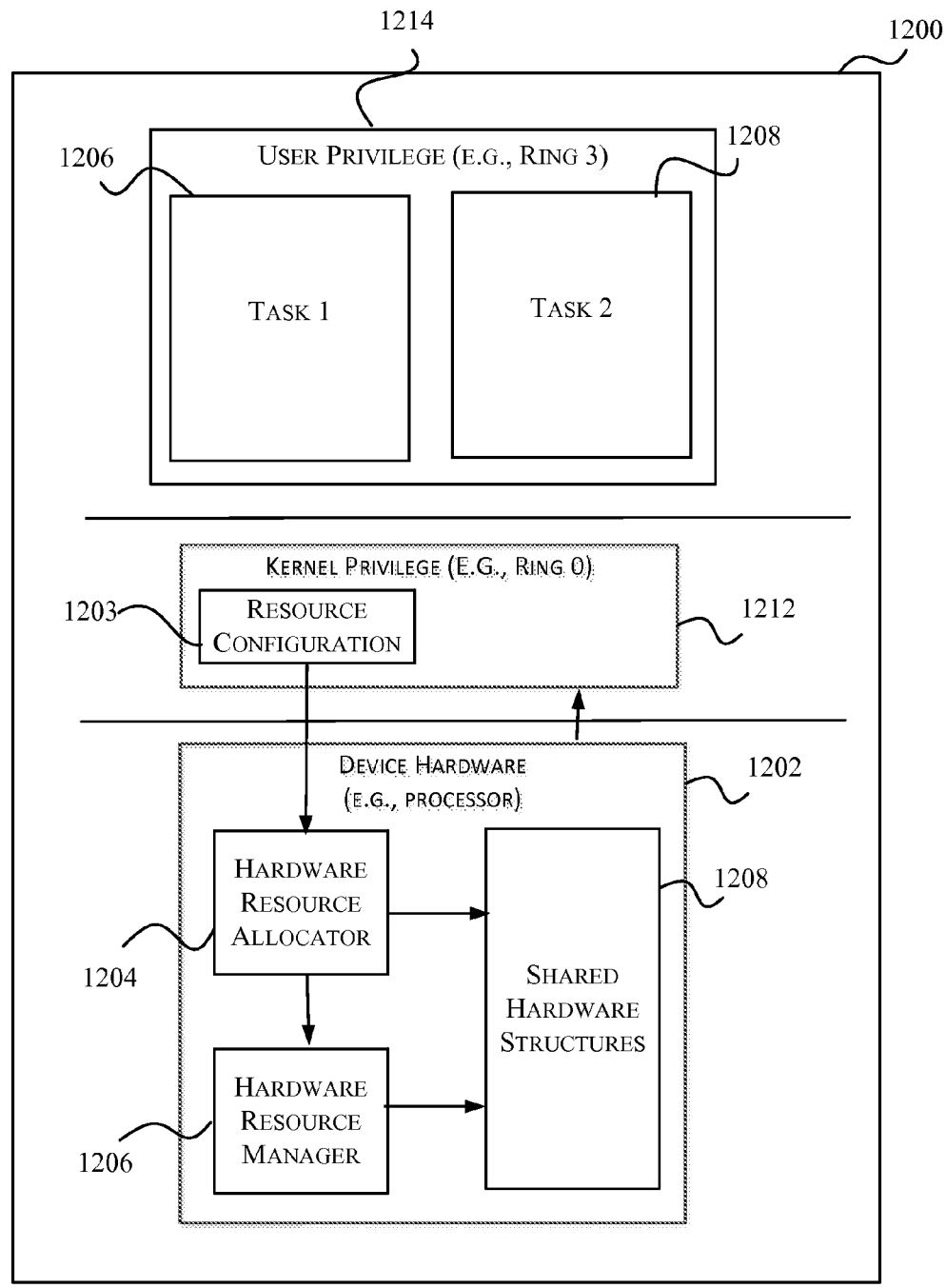
FIG. 12 is a block diagram illustrating techniques for providing dedicated resources from shared resources to a task, according to certain embodiments of the disclosure.

FIG. 12 is a block diagram illustrating techniques for allocating portion of a shared hardware resource to a task, according to some embodiments. FIG. 12 illustrates device hardware 1202 executing privileged code in kernel privilege 1212. Device hardware 1202 may include one or more processors, as well as other components for operating a computing system. In some implementations, the processors may provide hardware support for allocating portions of the shared hardware structures to specific tasks and managing such allocations. Examples of such processors may include but are not limited to Intel®, Qualcomm® and AMD® processors. Similar to what has been discussed before, for example, with reference to FIG. 1, certain processors may be architected to share hardware resources, when possible, for more efficiently utilizing certain hardware components. For example, multiple processing cores may share caches and certain busses on the processor. Furthermore, in some implementations, multiple execution threads may operate on the same processor sharing the execution pipeline and level 1 and level 2 caches.

In some implementations, privileged code/binary executing at kernel privilege 1212 may include operating system code/binary running at very high privilege levels on the device hardware. In some aspects, the level of privilege may determine the level of direct access and control of the hardware resources. For example, the kernel of the operating systems and drivers may operate at kernel privilege level 1212 (e.g., Ring 0 privilege level), and tasks such as applications and processes may operate at user privilege level 1214 (e.g., Ring 3 privilege level). The binary executing at kernel privilege 1212 may manage a first task 1206 and a second task 1208. In some embodiments, a task may refer to a group of computer executable instructions. Example of a task may include a processing thread, a process or an application that may include multiple processes.

FIG. 12 further shows resource configuration module 1203, hardware resource allocator module 1204, hardware resource manager module 1206 and shared hardware structures 1208. Resource configuration module 1203 may be implemented as part of kernel privilege 1212 in the operating system, and hardware resource allocator module 1204, hardware resource manager module 1206 and shared hardware structures 1208 may be implemented as part of device hardware 1202, such as the processor (hardware and/or microcode).

According to some aspects, the resource configuration module 1203 may configure the underlying hardware to associate certain portions of the shared hardware structures 1208 with a specific task. In some instances, the resource configuration module 1203 may use a task ID to associate a task with a specific portion of the shared hardware structure 1208. In some implementations, resource configuration module 1203 may configure computing device 1200 such that all access requests originating from a task and directed towards the shared hardware structure 1208 are restricted to certain portions of the shared hardware structure 1208, and no other tasks may access the resources specific to the second task 1208. Resource configuration module 1203 may be implemented using any combination of techniques discussed above with reference to FIG. 6, where portions of the shared hardware structures are associated with the tasks and task IDs and/or with the VMs and VM IDs.

The hardware resource allocator module 1204 may appropriately allocate or associate certain resources with specific tasks. The hardware resource allocator module 204, may use specific configurations, overrides or hints set by the resource configuration module 1203 from the kernel privileged code/binary 1212 in allocating or associating portions of the shared hardware resources to specific tasks. In some instances, the resource allocator module may automatically and dynamically allocate and associate the shared hardware resources for the tasks executing on the processor. Hardware resource allocator module 1204 may be implemented using any combination of techniques discussed above with reference to FIG. 4, where portions of the shared hardware structures are associated with the tasks and task IDs and/or with the VMs and VM IDs.

In some aspects, hardware resource manager module 1206 may manage access to the shared hardware structures 1208. For example, in one implementation, the hardware resource allocator module 1204 may create a mapping table in the hardware resource manager module 1206 between the tasks and the particular shared hardware resources from the shared hardware structures 1208. During execution, the hardware resource manager module 1206 may provide the appropriate mapping for resource accesses. In addition, the hardware resource manager module 1206 may also provide certain hardware implemented (e.g., microcode) handlers for handling access to restricted resources during the execution of instructions belonging to a particular task. Hardware resource manager module 1206 may be implemented using any combination of techniques discussed above with reference to FIG. 5, where portions of the shared hardware structures are associated with the tasks and task IDs and/or with VMs and VM IDs.

In certain aspects of the disclosure, the accesses to the shared hardware structures 1208 may be handled by the hardware resource manager module 1206 implemented in the device hardware 1202. For example, for accessing dedicated caches, buffers or other resources for a task, the access may be handled by the hardware resource manager module 1206. Although, shown as one module in the figures for ease of illustration, the shared hardware structures 1208 may be dispersed throughout the processor and/or the computing system. Shared hardware structures may include hardware resources, such as one or more of a Level 1 cache, a Level 2 cache, a Level 3 cache, Translation Lookaside Buffer (TLB), Write Combining Buffer, Branch Prediction Table, Branch Target Buffer, processor cycles, memory bus access, cache access, I/O access, network access, specialized execution units, memories such as DRAMs external to the processor, storage resources such as disk space, input/output resources such as network interface units, etc.

Techniques and components described with reference to FIGS. 1-11 may be used in any combination to implement aspects of the modules or components, such as the kernel privileged components 1212 and/or the device hardware 1202 described in FIG. 12 without deviating from the scope of the invention. In some aspects, techniques described in FIGS. 1-11 are applicable to FIG. 12 by associating portions of the shared hardware structures with tasks and task IDs and/or with VMs and VM IDs.

Figure 13:
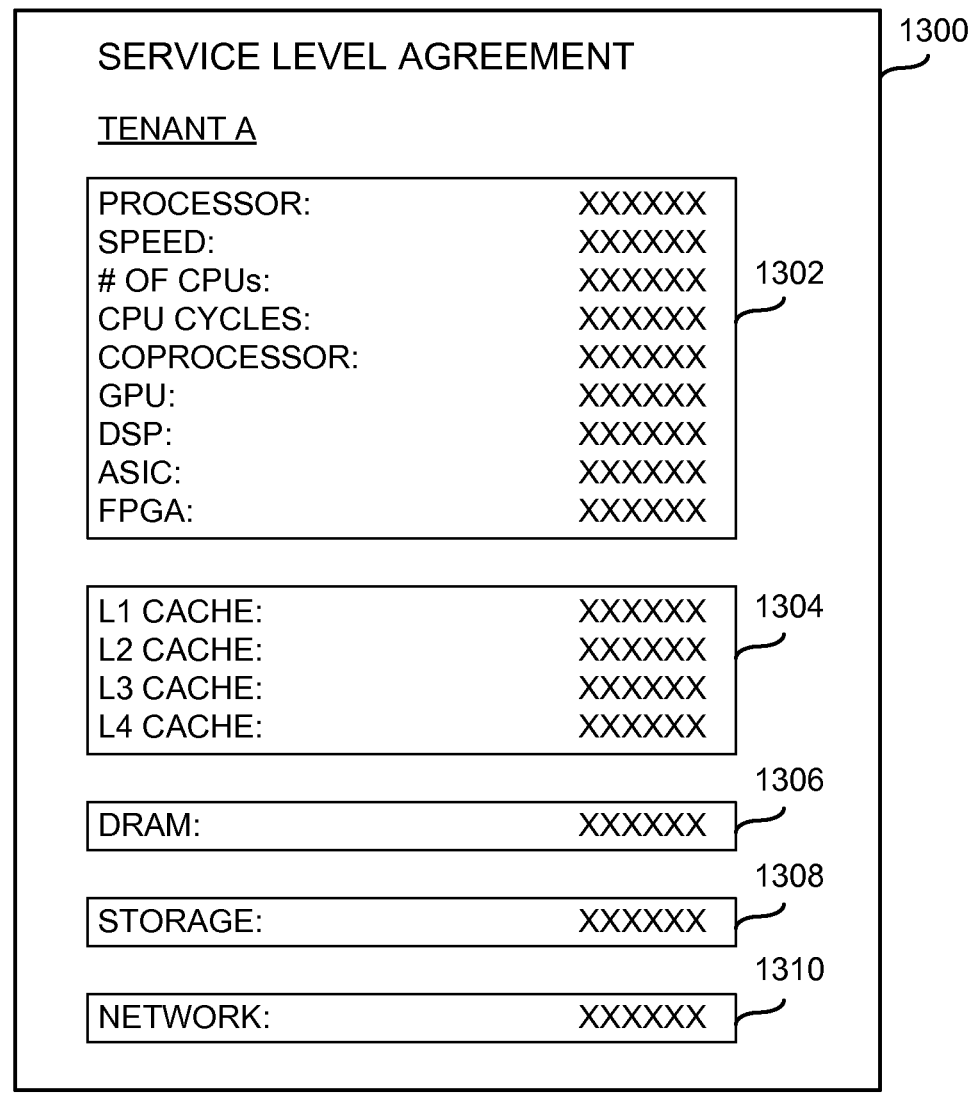
FIG. 13 illustrates example information from a service level agreement, according to certain embodiments of the disclosure.

FIG. 13 illustrates examples of information from a service level agreement (SLA) 1300 that may be used for allocating or associating hardware resources with a particular task or virtual machine instance, according to some embodiments. In the example shown, SLA 1300 may be an agreement between tenant A and a shared hardware resource provider such as a cloud service provider. SLA 1300 may define the types and amounts of computing resources and services that the shared hardware resource provider has agreed to provide to tenant A. In some embodiments, the SLA may omit the specific description of some or all of the various types and amounts of computing resources, and may instead define the level of service provided to a tenant as one of multiple levels of services available (e.g., tier 1, tier 2, tier 3, etc.). In such implementations, each tier level of service may map to a listing of types and amounts of computing resources, and the particular level of service is used to derive the information shown in FIG. 13.

In some embodiments, the amount of computing resources available to a tenant under the SLA can be used to scale appropriate or proportionate amounts of other types of computing resources for the tenant. For example, suppose under the SLA, a tenant is provided with 100 processor cycles per hour, and this reflects a 50% utilization of a processing unit. In such a scenario, 50% of the cache and DRAMs can also be made available to the tenant such that sufficient supporting resources are available to the tenant to utilize the full 50% of the processing unit.

According to some embodiments, SLA 1300 may describe processing resources 1302 from the shared hardware resources that tenant A may have access to or may utilize for execution of a task under the agreement. These may include the type of processor (e.g., manufacturer, model), speed of processor, number of processors and number of processor cycles per time interval (e.g., number of cycles per hour). In some embodiments, the processing resources may also include access to coprocessors and/or specialized execution units coupled to the processor, which can be used to execute application specific or complex tasks or instructions. In some implementations, the specialized execution units may execute the application specific or complex instructions in parallel to the processor. Examples of specialized execution units may include coprocessors, graphic processing units, digital signal processors, application specific integrated circuits and/or logic implemented in programmable logic devices such as field programmable gate arrays (FPGAs).

In some embodiments, SLA 1300 may describe the types and amounts of memory resources 1304 and 1306 available to tenant A. The memory resources may include memory resources that are internal or are close to the processor 1304 (e.g., L1 cache, L2 cache, L3 cache, L4 cache) and their related structures (e.g., TLB) and/or memory resources that may be external to the processor 1306 such as DRAMs. SLA 1300 may describe the amounts of each memory resource for allocation to tenant A, such as the number of ways of cache, or the number of banks of DRAM. SLA 1300 may also describe other computing resources that are available to tenant A such as storage resources 1308 and I/O resources 1310. For example, SLA 1300 may describe the types and amounts of storage (e.g., disk or steady state storage, storage space, access speed, etc.). SLA 1300 may also describe I/O bandwidth available for tenant A such as network upload and download speeds.

It should be understood that the computing resources described in SLA 1300 are just examples, and that other SLAs may describe fewer or more computing resources that may be available to a tenant, and that some computing resources not specifically described in a SLA can be implied from the information provided in the SLA.

Figure 14:
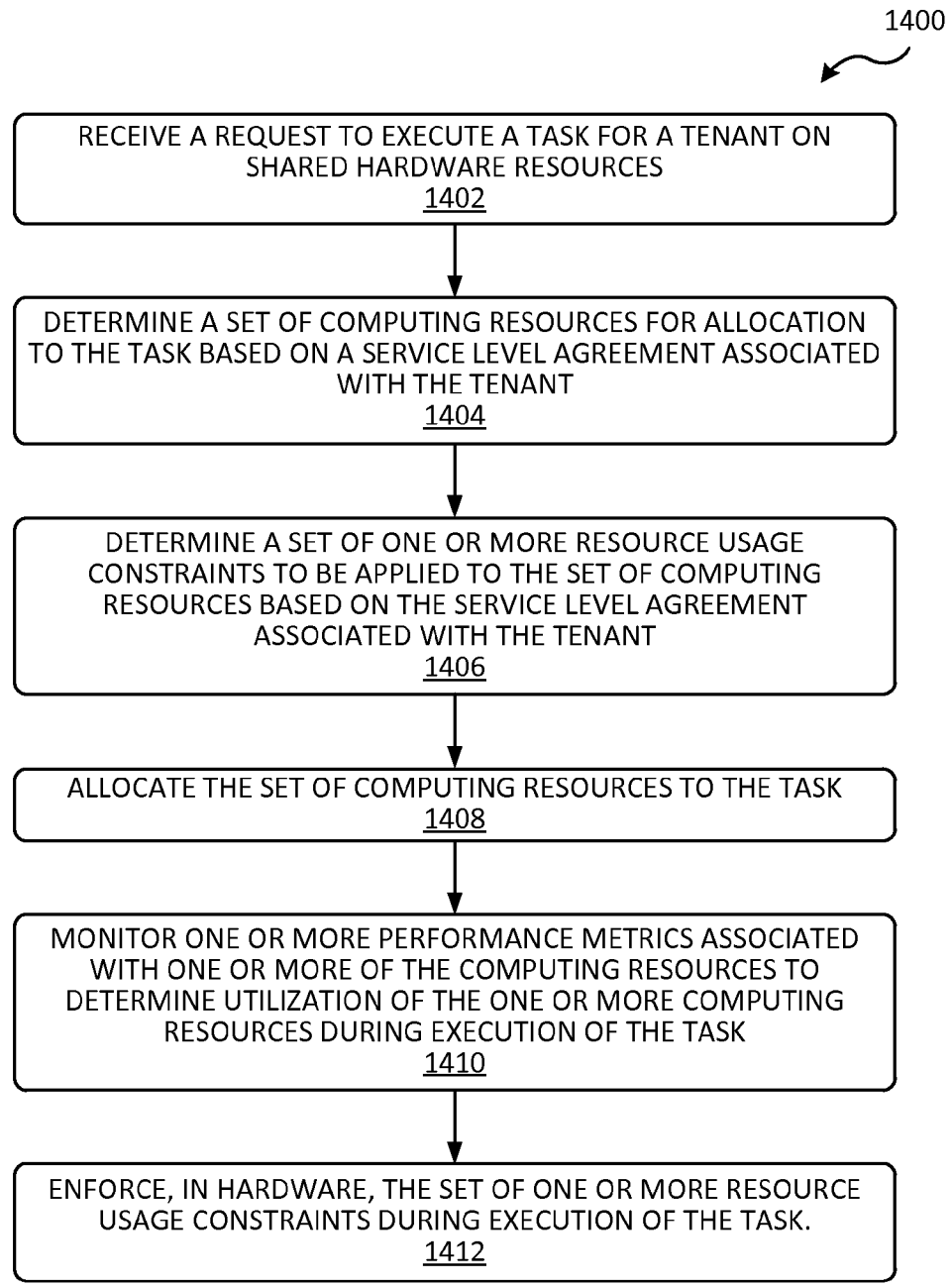
FIG. 14 illustrates a flow diagram of a process for allocation computing resources, according to certain embodiments of the disclosure.

FIG. 14 illustrates a flow diagram of a process 1400 for allocating or associating computing resources to a task or virtual machine instance, according to some embodiments. Some or all of process 1400 (or any other processes described herein, or variations and/or combinations thereof) may be performed under the control of one or more computer systems configured with executable instructions and may be implemented as code (e.g., firmware, executable instructions, one or more computer programs or one or more applications) executing collectively on one or more processors, or by hardware or combinations thereof. The code may be stored on a computer-readable storage medium, for example, in the form of a computer program that may include a plurality of instructions executable by one or more processors. The computer-readable storage medium may be non-transitory. For example, some or all of process 1400 can be performed by a hardware resource allocator module (e.g., hardware resource allocator module 400), or some or all of process 1400 can be performed by hardware logic, or a combination of hardware logic and hardware resource allocator module, as explained further below.

At block 1402, a request to execute a task for a tenant on shared hardware resources is received at a computing device. The request may include requesting instantiation of a virtual machine instance for the tenant to execute the task. In some embodiments, a task ID or VM ID can be assigned to the task or virtual machine instance. The task may involve executing one or more instructions, and may include a processing thread, a process, or an application that may include multiple processes. The shared hardware resources may include one or more computing resources, and may include processing resources, memory resources, storage resources and/or I/O resources. Processing resources may include one or more processors, processor cores, coprocessors, specialized execution units such as GPUs, DSPs, ASICs, programmable logic devices (e.g., FPGAs) or other logic circuits that can execute application specific or complex instructions. Memory resources may include various levels of cache memories (e.g., one or more blocks of one or more of a Level 1 cache, a Level 2 cache, a Level 3 cache and a Level 4 cache, etc.) and their related structures such as TLBs, system memories such as one or more banks of DRAMs, etc. Storage resources may include disk space or other system storage. I/O resources may include resources to transferring data between the computing device hosting the computing resources and the external world such as network interface components and network bandwidth.

At block 1404, process 1400 determines a set of computing resources for allocation to the task or to the virtual machine instance for execution of the task based on a service level agreement (SLA) associated with the tenant. For example, a SLA associated with the tenant such as SLA 1300 may be used to determine the set of computing resources to allocate to the task. In some embodiments, the information from the SLA can be used by resource allocation policy module 410 to set the policy on how the resources can be allocated to this tenant. The information regarding the computing resources to provide to a tenant can be stored, for example, in a table associated with a task identifier assigned to the tenant. The set of computing resources may include a processing resource, and in some embodiments, may further include at least one of a memory resource, a storage resource, and an I/O (input/output) resource, such as those as described above.

At block 1406, process 1400 determines a set of one or more resource usage constraints to be applied to the set of computing resources based on the SLA associated with the tenant. For example, a resource usage constraint can be a cap on the consumption amount of a computing resource per time interval, a fixed quantity or fixed proportion of a computing resource to allocate to the task, a limit on how long or how much access of a computing resource can be given to a task or any combination thereof. Examples of resource usage constraints may include a number of processor cycles per time interval, a number of bytes of memory accessed by a memory controller per time interval, a number of megabytes of DRAM, a number of gigabytes of disk storage, access to a number of coprocessors or specialized execution units, etc. In some embodiments, a mapping of the resource usage constraints to the corresponding computing resources and tenant can be stored in memory (e.g., an array or table in DRAM) or in hardware registers. During execution of the task or during the life of the virtual machine instance, this mapping can be accessed by hardware logic to perform hardware enforcement of the resource usage constraints on the computing resources.

At block 1408, the set of computing resources for execution of the task can be allocated to the task or to the virtual machine instance used for execution of the task. If a virtual machine instance for execution of the task has not instantiated yet, a virtual machine instance can be instantiated on the shared hardware resources. Allocating the set of computing resources may involve associating the set of computing resources to a task ID or VM ID associated with the tenant requesting execution of the task, for example, by resource mapping module 408. Examples of allocating the set of computing resources may include allocating one or more blocks of one or more of a Level 1 cache, a Level 2 cache, a Level 3 cache and a Level 4 cache for execution of the task based on the SLA (e.g., by tagging one or more blocks of the corresponding cache with the task ID or VM ID associated with the task to expose or make visible the corresponding blocks of cache to the task); allocating one or more banks of dynamic random access memory (DRAM) for execution of the task based on the SLA (e.g., by a memory controller tagging one or more blocks or one or more ranks of DRAM with the task ID or VM ID associated with the task to expose or make visible the corresponding banks or ranks of DRAM to the task); providing access to one or more coprocessors for the execution of the task based on the SLA; and/or providing access to one or more coprocessors and/or specialized execution units for the execution of the task based on the SLA. It should be understood that these are just examples, and that any portions of any of the shared hardware resources described herein can be allocated or assigned to a task or virtual machine instance.

In some embodiments, access to a coprocessor and/or specialized execution unit can be achieved by way of appropriately executing a coprocessor instruction in a coprocessor or executing a specialized machine instruction in the corresponding specialized execution unit. When a coprocessor instruction for a coprocessor or a specialized machine instruction for a specialized execution unit of the shared hardware resources is received during execution of a task, depending on whether the SLA associated with the tenant permits the tenant to have access to the coprocessor or specialized execution unit; the instruction can be forwarded to the coprocessor or specialize execution unit for execution, or be discarded if the SLA does not permit the tenant to have access to the coprocessor or the specialized execution unit. For example, suppose a SLA provides a tenant with access to a GPU, when a GPU instruction is received during execution of a task associated with the tenant, the GPU instruction can be forwarded to the GPU for execution. Whereas if the SLA does not provide the tenant with access to a GPU, if a GPU instruction is received during execution of the task, the GPU instruction may be discarded since the tenant does not have permission to utilize the GPU. In some embodiments, if the tenant does not have permission to utilize the coprocessor or specialized execution unit, the specialized machine instruction can be decoded into normal processor instructions for execution on a processor rather than on the coprocessor or specialized execution unit. In some embodiments, resource allocation policy module 410 may control how a coprocessor instruction or specialized machine instruction from a tenant is executed.

In some embodiments, the amounts of the various different computer resources allocated to a task can be scaled together. For example, if 25% of the processor cycles of a processing unit is allocated to a task, 25% of the cache, DRAMs, and/or other computing resources may also be allocated to the task to prevent other tasks from hindering the full usage of the 25% of processor cycles. For example, other tasks or tenants that may be utilizing the shared computing resources disproportionally and may take up excessive amounts of cache and other resources (e.g., 30% of processor cycles but 60% of cache). By scaling the computing resources allocated to a task together, such disproportionate utilization can be prevented.

At block 1410, process 1400 may monitor one or more performance metrics such as performance counters associated with one or more of the computing resources to determine an activity level or utilization of the one or more computing resources during execution of the task. In some embodiments, this can be performed by resource monitoring module 416 or by hardware logic. For example, an instruction or program counter can be monitored to determine processor activity or utilization during execution of the task. The number of processor instructions associated with a task (e.g., as identified by a task ID or VM ID) being executed over a time period or time interval can be used to determine how much of the processor is being used up by the task during that time period or time interval. Similarly, a cache miss counter and/or a cache hit counter can be monitored to indicate the amount of cache used by the task. A memory controller read byte counter and/or a memory controller write byte counter can be monitored to indicate the amount of memory (e.g., DRAM) being used by the task. A network traffic counter can be monitored to determine that amount of I/O traffic being used by the task. According to some embodiments, one or more of the performance counters can be implemented as hardware counters.

At block 1412, the set of one or more resource usage constraints can be enforced in hardware during execution of the task. In some embodiments, the hardware enforcement of the resource usage constraints can be performed without software intervention (e.g., without operating system or hypervisor controls). For example, hardware logic or microcode can compare the utilization of a computing resource over a time interval with the corresponding resource usage constraint stored in memory or hardware registers. In some embodiments, when the utilization of a computing resource by the task or by the virtual machine instance has reached the corresponding resource usage constraint in a time interval, the task or virtual machine instance can be prevented from further utilizing the computing resource in the same time interval. For example, execution of the task can be delayed until the next time interval with the computing resource becomes available to the task under the resource usage constraint set by the SLA.

Preventing a task or virtual machine instance from further utilizing the computing resource be achieved, for example, by turning off hardware enable bits, un-tagging the corresponding computing resource, or disassociating the computing resource with the task ID or VM ID to mask the computing resource from the task once the utilization of the computing resource has reached the resource usage constraints. At the next time interval when the computing resource is made available to the task again (based on the resource usage constraints), the hardware enable bits can be turned back on, or the corresponding computing resource can be re-tagged or re-associated with the task ID or VM ID to make the computing resource visible to the task again. In some embodiments, depending on the SLA, a minimal level of the computing resource can be maintained for the task even when the task has consumed the resource usage constraint amount of the computing resource.

In some embodiments where the computing resources include a processing resource such as a number of processor cycles per time interval, enforcing the resource usage constraints may include adjusting an execution pipeline priority of processor instructions associated with the task based on the utilization of the processing resource relative to its corresponding resource usage constraint. For example, suppose a resource usage constraint limits the number of processor cycles allocated to a particular task to 100 cycles. If the task has already consumed 100 processor cycles in the time interval, the priority of the next processor instruction for the task can be adjusted to be the lowest priority such that the processor instruction is executed only when other higher priority tasks are idle or if excess processor cycles are available. In some embodiments, the processor instruction can be held in a buffer to delay execution of the processor instruction until the next time interval.

As compared to software implementations, enforcing the resource usage constraints in hardware can provide finer grain control in the utilization of the computing resources. For example, continuing with the processor cycle per time interval example above, the time it takes for a hypervisor or operating system to detect that the allowable number of processor cycles have been used up in a time interval by a task and to instruct the system to reconfigure the resource allocation can be in the order of a few milliseconds. During this time, the task may be able to use up excessive processor cycles beyond the resource usage constraint warranted by the SLA. In contrast, by enforcing the resource usage constraint in hardware, the very next processor instruction associated with the task beyond the resource usage constraint can be de-prioritized or delayed to provide better enforcement of the resource usage constraints.

According to some embodiments, based on the activity level or utilization of the one or more computing resources, the one or more allocations of the computing resources allocated for execution of the task can be adjusted. In some embodiments, this can be performed by automatic resource management module 404. For example, suppose the SLA associated with the tenant provides the tenant with a certain number of processor cycles per time period (e.g., per second, per minute, per hour, etc.). If the performance metrics associated with the processor (e.g., hardware performance counters such as processor instruction or program counter) indicates that only half of that number of processor cycles is being used up by the task of the tenant, then in some embodiments, the number of processor cycles allocated to the task can be reduced by the unused amount or a portion thereof (e.g., can be reduced by half or less). In this manner, unused computing resources allocated to a particular task can be reallocated to other tasks such that the shared hardware resources can be used more efficiently, and that computing resources allocated to a task are not left idle and wasted.

In some embodiments, the activity level or utilization of the one or more computing resources can also be used to increase the allocation of the one or more computing resources to a task. Continuing with the example above, suppose the number of processor cycles per time period allocated to a task is less than the maximum allowable by the SLA (e.g., if the allocation has been reduced due to inactivity), if the performance metrics associated with the processor indicates that the task is using close to the number of processor cycles allocated to the task, or shows a trend that the number of processor cycles used by the task is increasing, then the number of processor cycles allocated for the task can be increased up to the allowable amount under the SLA. As another example, if the cache miss to cache hit ratio is high or is increasing, then the number of ways of cache being allocated to a task can be increased up to the allowable amount under the SLA. In some embodiments, the utilization of one computing resource can be used to throttle and adjust the allocations of other computing resources, for example, in implementations where the allocations of different computing resources are scaled together. Thus, as the allocation of one computing resource is being adjusted, the allocations of other computing resource can be adjusted accordingly.

In some implementations, the monitoring and allocation adjustment of the computing resources can be performed using hardware. For example, hardware registers can be configured with an allowable value representing the amount of a computing resource that can be allocated to a task under the SLA and an allocation value indicating the amount of the computing resource currently being allocated to the task. The count value in the hardware performance counter associated with the computing resource for a particular task can be compared with the allocation value to determine how much of the allocated computing resource the task is utilizing. Based on this comparison or an observed trend of the count value, microcode executed as a background process can be used to adjust the allocation of the computing resource up to the allowable value. In some embodiments, the utilization of one computing resource can be used to throttle and adjust the allocation of other computing resources.

Although the allocation of a computing resource can be throttled and adjusted as described above, one or more of the computing resources allocated at block 1404 may be static, and the allocation of the computing resource may remain the same and not be adjusted during execution of the task regardless of the utilization or activity level of that computing resource. For example, the amount of storage disk space allocated to a task may remain static and unchanged during execution of the task regardless of how much storage the task is using at any point in time. In some embodiments, which of computing resources are dynamically adjusted and which are static can be defined by the SLA.

In implementations where a computing resource is adjusted based on the activity level or utilization of the computing resource, an unused portion of the computer resource over a time period or time interval can be banked or accumulated as a resource credit balance such that when additional computing resource is needed at a later time period or time interval, the banked or accumulated amount of the unused computing resource can be made available to tenant. In other words, the resource credit balance accumulated for a task or tenant can be applied to increase the amount of the computing resource at a later point in time when execution of the task demands a burst of the computing resource. In some embodiments, depending on the credit resource balance, the amount of the computing resource allocated to a task at a point in time may exceed the baseline amount of the computing resource indicated by a SLA associated with the tenant.

Figure 15:
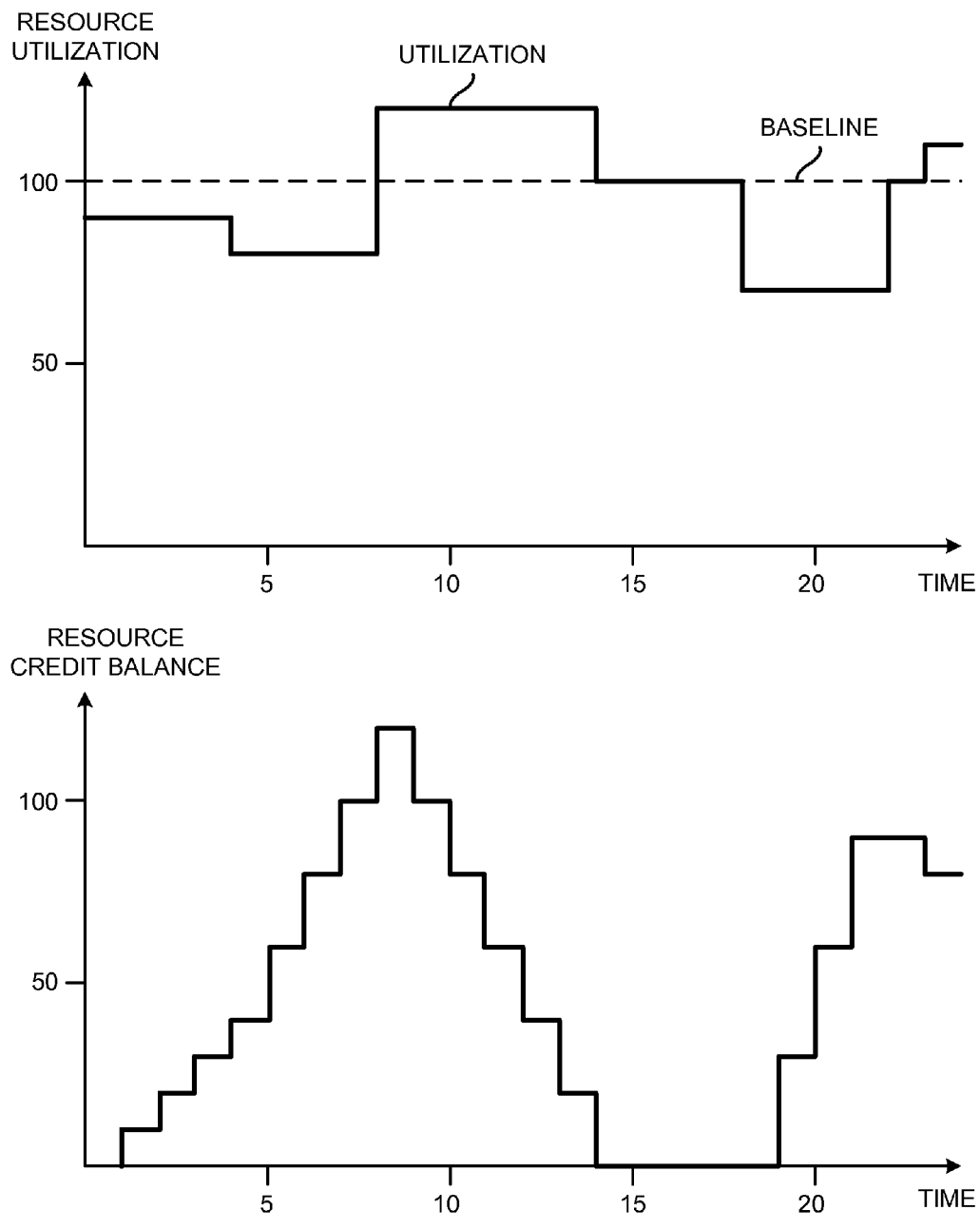
FIG. 15 illustrates an example of banking unused computing resources, according to certain embodiments of the disclosure.

FIG. 15 illustrates the concept of banking a computing resource according to some embodiments. In the upper graph, the amount of utilization of a computing resource over time is shown as the solid line, and the baseline amount of the computing resource is shown as the dotted line. The baseline amount can be, for example, a baseline resource credit per time interval (e.g., processor cycles per hour) that is available to a tenant under a SLA. In the lower graph, the resource credit balance accumulated for the computing resource over time is shown.

In the example shown, the baseline resource credit per time interval (e.g., per second, per minute, per five minutes, per ten minutes, per hour, etc.) of the computing resource is 100 credits. In other words, in each time interval, 100 credits of the computing resource can be allocated to the task or virtual machine instance. In the first time interval t=1, the task has only utilized or consumed 90 credits of the computing resources. As a result, 10 unused credits (the difference between the baseline resource credit and the utilization amount) are accumulated in the resource credit balance at the end of the first time interval. At the second time interval t=2, the task consumed another 90 credits, and another 10 credits are accumulated as shown, yielding a resource credit balance of 20 credits at the end of the second time interval.

This accumulation process continues until time t=8, when the task demands an amount of computing resource beyond the baseline resource credit. As shown, the task demands a burst of 120 credits of the computing resource at time t=8. Since the unused amounts of the computing resource in prior time intervals have been banked, even though the task is demanding more of the computing resource than the baseline amount, the extra 20 credits of the computer resource are made available to the task at time t=8.

Following the example, the task utilizes 120 credits of the computing resource for the next six time intervals. For each time interval where utilization of the computing resource exceeds the baseline resource credit, the difference between the utilization amount and the baseline resource credit is deducted from the resource credit balance. At time t=14, the baseline resource credit previously accumulated has been used up. As a result, even if the task demands more of the computing resource than the baseline amount, the amount of the computing resource available to the task is capped at the baseline amount as shown.

During the next four time intervals, the task is consuming the full baseline amount, and therefore, the resource credit balance remains zero because there is no unused amount of the computing resource to bank. At time t=18, the task again consumes less than the baseline amount, and the resource credit balance begins accumulating again. In some embodiments, this process may continue until a predetermined number of time intervals have elapsed (e.g., number of time intervals totaling an hour, a day, a month, etc.), at which point, the resource credit balance is reset to zero such that unused computing resources are not accumulated indefinitely.

It should be understood that the concept of banking or accumulating unused computing resource can be applied to any of the computing resources described herein. In some embodiments, any number of computing resources allocated to a task may have its own resource credit balance, and in some implementations, unused amounts of one or more of the computing resources may be allowed to accumulate, while unused amounts of other computing resources may not be allowed to accumulate. Furthermore, in some embodiments, a resource credit balance accumulated for one computing resource may be applied to obtain additional amounts of another computing resource. Moreover, one credit of a computing resource may be exchanged for fewer or more credits of another computing resource. In some embodiments, whether an unused amount of a computing resource is allowed to be accumulated and the associated exchange rate for other computing resources, if any, can be defined by the SLA associated with the tenant.

Figure 16:
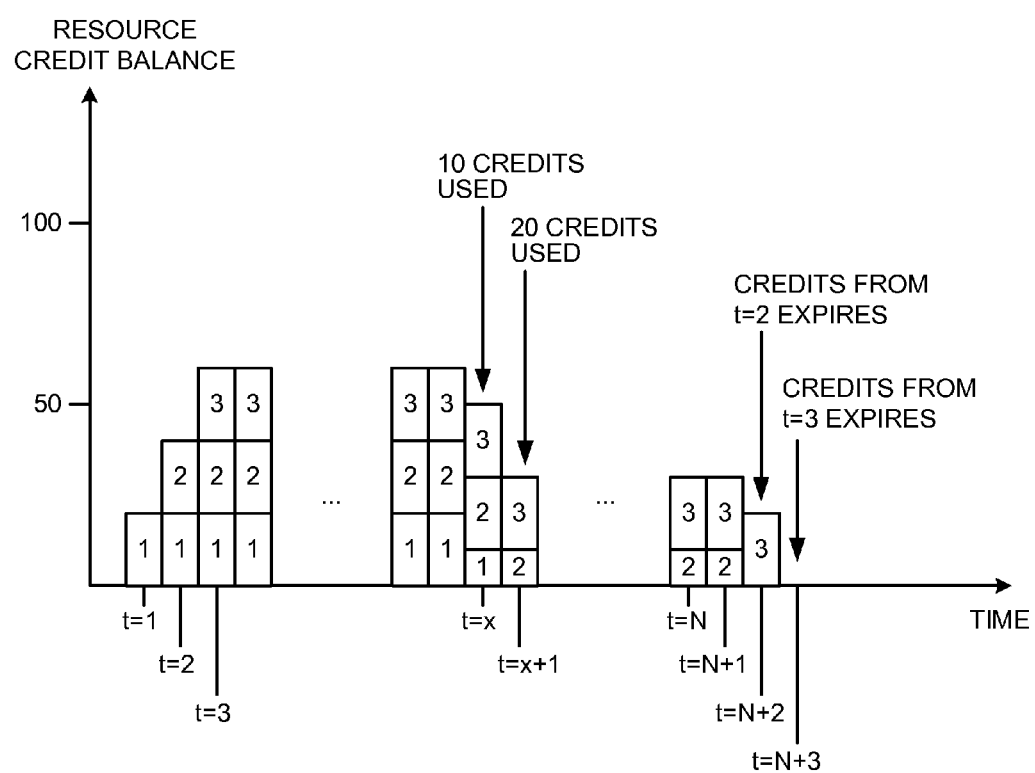
FIG. 16 illustrates an example of resource credits expiring, according to certain embodiments of the disclosure.

FIG. 16 illustrates the concept of unused resource credits expiring, according to some embodiments. In the diagram, the resource credit balance accumulated for a computing resource over time is shown. The resource credits accumulated in each time interval are shown with a number to indicate the time at which the resource credit was accumulated. According to some embodiments, the resource credit balance is implemented as a first-in-first-out (FIFO) system. The oldest accumulated resource credits are used up first. In some embodiments, the resource credits accumulated at a particular time interval may expire if left unused after a predetermined number of time intervals (e.g., the predetermined number of time intervals can be the number of time intervals that make up an hour, a day, a week, a month, etc.).

In the example shown, at time t=1, 20 resource credits are accumulated, and these credits are marked with a "1" in the figure to indicate that they were accumulated at time t=1. At time t=2, another 20 resource credits are accumulated and are marked with a "2." At time t=3, another 20 resource credits are accumulated and are marked with a "3." In the particular example shown, no additional resource credits are accumulated after time t=3.

At some later time at time t=x, but before a predetermined number of time intervals N, 10 resource credits from the resource credit balance are used up by the task (e.g., when the task demands additional computing resources beyond the baseline amount). As shown in FIG. 16, the oldest accumulated resource credits (in this example, from time t=1) are applied and used first. At time t=x+1, the task utilizes another 20 resource credits from the resource credit balance. As shown, because only 10 credits accumulated from time t=1 remained at that time, the remaining 10 credits from time t=1 and 10 credits accumulated from time t=2 are applied to the task. In the particular example shown, no further resource credit from the resource credit balance is used by the task.

At a later time when time t=N (i.e., after a predetermined number of time intervals N have elapsed), the resource credits accumulated from prior time interval may begin to expire. For example, at time t=N+1, the resource credits accumulated from time t=1 are set to expire. However, because all credits accumulated from time t=1 were already applied to and used by the task, there is no impact to the resource credit balance. Then at time t=N+2, the resource credits accumulated from time t=2 expire. As shown, at time t=N+2, the 10 remaining resource credits that were accumulated from time t=2 are removed or decremented from the resource credit balance. Similarly, at time t=N+3, the resource credits accumulated from time t=3 expire, and the 20 resource credits that were accumulated from time t=3 are removed or decremented from the resource credit balance.

Figure 17:
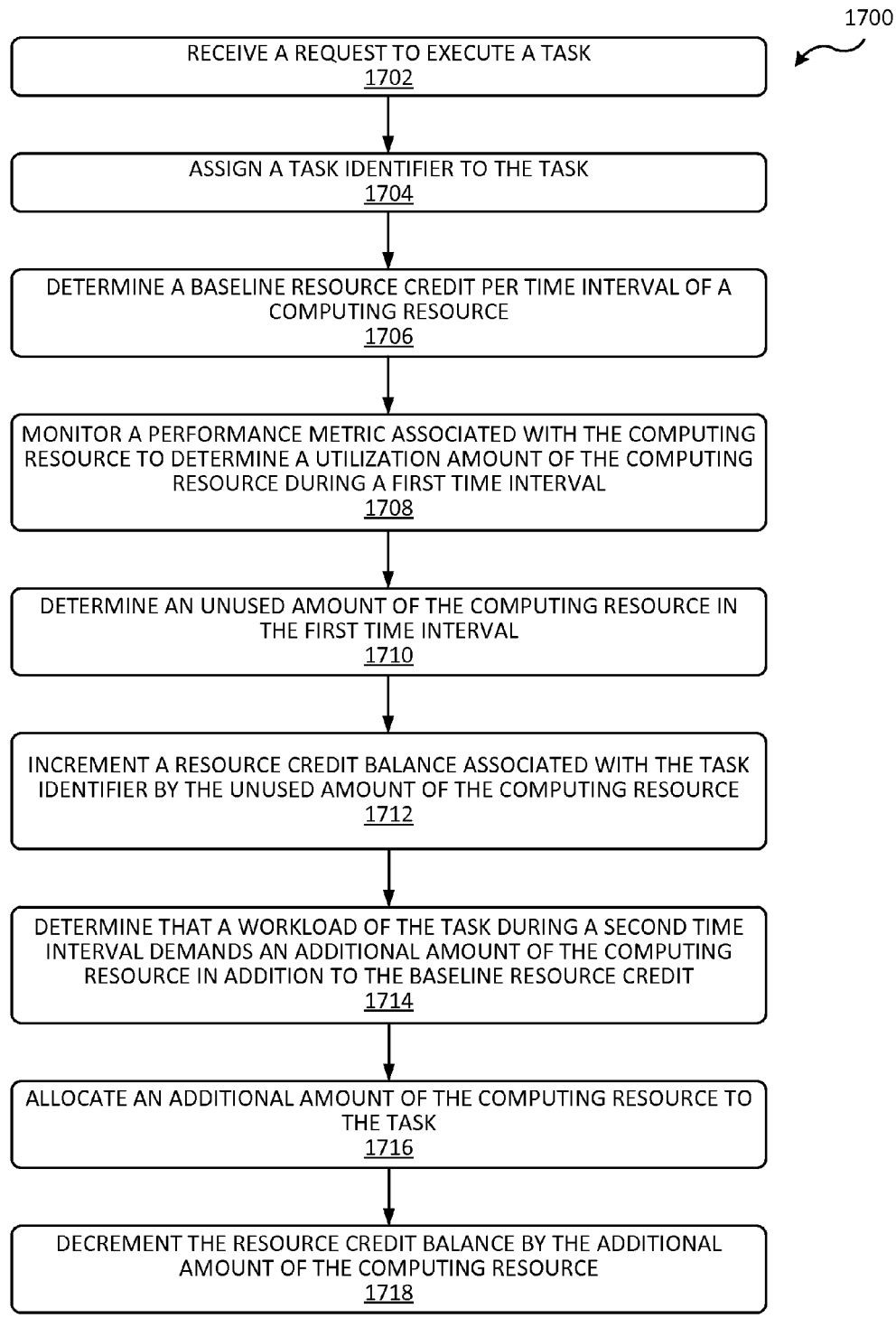
FIG. 17 illustrates a flow diagram of a process for banking unused computing resources, according to certain embodiments of the disclosure.

FIG. 17 illustrates a flow diagram of a process 1700 for banking or accumulating a computing resource in a single or multi-tenant operating environment, according to some embodiments. For example, some or all of process 1700 can be performed by a hardware resource allocator module (e.g., hardware resource allocator module 400). At block 1702, a request to execute a task for a tenant on shared hardware resources is received at a computing device. The request may include instantiating a virtual machine instance for the tenant to execute the task. The task may involve executing one or more instructions, and may include a processing thread, a process, or an application that may include multiple processes. The shared hardware resources may include one or more computing resources, and may include processing resources, memory resources, storage resources and/or I/O resources. Processing resources may include one or more processors, processor cores, coprocessors, specialized execution units such as GPUs, DSPs, ASICs, programmable logic devices (e.g., FPGAs) or other logic circuits that can execute application specific or complex instructions. Memory resources may include various levels of cache memories (e.g., one or more blocks of one or more of a Level 1 cache, a Level 2 cache, a Level 3 cache and a Level 4 cache, etc.) and their related structures such as TLBs, system memories such as one or more banks of DRAMs, etc. Storage resources may include disk space or other system storage. I/O resources may include resources for transferring data between the computing device hosting the computing resources and the external world such as network interface components and network bandwidth.

In some embodiments, at block 1704, a task identifier (or VM ID) is assigned to the task. This can be performed, for example, by ID space management module 414. The task identifier can be a value that is incremented for each task, a value derived from a tenant identifier, a random value, or other suitable identifier to uniquely identify the task. According to some embodiments, the task identifier can be used to track the utilization and unused amounts of a computing resource for the task or corresponding tenant. For example, a resource credit balance associated with the task identifier can be maintained during execution of the task to keep track of the unused amount of a computing resource.

At block 1706, a baseline resource credit per time interval or time period indicating a baseline amount of a computing resource available for the tenant to execute the task is determined. In some embodiments, this can be performed by resource allocation policy module 410. For example, the baseline resource credit can be determined based on a SLA associated with the tenant. In some embodiments, the baseline resource credit can be expressed as a credit per second, per minute, per five minutes, per ten minutes, or per hour, etc., and the baseline resource credit per time interval represents a baseline amount of the computing resource to associate with the task identifier (e.g., for allocation to the task associated with the task identifier) in each time interval over a predetermined number of time intervals.

At block 1708, process 1700 may monitor a performance metric (e.g., a performance counter) associated with the computing resource to determine an activity level or utilization amount of the computing resources by the task during a time interval. This can be performed, for example, by resource monitoring module 416. The performance counter can be used to determine the consumption of the computing resource by the task in the time interval. For example, an instruction or program counter can be monitored to determine processor activity or utilization by the task in the time interval. The number of processor instructions associated with a task (e.g., as identified by a task ID or VM ID) being executed over the time interval can be used to determine how much of the processor is being used up by the task during that time interval. Similarly, a cache miss counter and/or a cache hit counter can be monitored to indicate the amount of cache used by the task. A memory controller read byte counter and/or a memory controller write byte counter can be monitored to indicate the amount of memory (e.g., DRAM) being used by the task. A network traffic counter can be monitored to determine that amount of I/O traffic being used by the task. According to some embodiments, one or more of the performance counters can be implemented as hardware counters.

At block 1710, an unused amount of the computing resource in the time interval is determined. In some embodiments, this determination can be performed by resource monitoring module 416. For example, the unused amount can be determined based on a difference between the utilization amount of the computing resource during the time interval as derived from block 1608 and the baseline resource credit from block 1606. At block 1612, a resource credit balance associated with the task identifier is incremented by the unused amount of the computing resource. This can be performed over a predetermined number of time intervals such that an unused amount of the computing resource in each time interval can be accumulated over the predetermined number of time intervals.

At block 1714, process 1700 may determine that the workload of a task at a later time interval demands a utilization amount of the computing resource that exceeds the baseline resource credit or baseline amount of the computing resource. This can be performed, in some embodiments, by automatic resource management module 404. As an example, suppose the computing resource is a number of processor cycles per time interval. The system can determine that the workload of the task is demanding additional processor cycles if the processor receives a processor instruction associated with the task in a time interval after the baseline number of processor cycles in the same time interval has already been used up, or if the task is not idle after the baseline amount of computing resource in the same time interval has already been used up. Other computing resources may use a similar mechanism to determine that the task is demanding additional amounts of a computing resource in excess of the baseline amount. Even though the workload of a task may be demanding additional amounts of a computing resource, as the unused amounts of the computing resource in one or more prior time intervals are accumulated or banked, the additional amount of the computing resource exceeding the baseline amount can be allocated to the task or be assigned to the task identifier associated with the task. In some embodiments, the additional amount of the computing resource being allocated to the task or associated with the task identifier is less than or equal to the current resource credit balance available.

At block 1716, the additional amount of the computing resource associated with the task identifier is allocated to the task. In this manner, up to the accumulated amount of the computing resource can be applied to the task when a workload of the task utilizes more than the baseline amount of the computing resource. In some embodiments, a proportionate additional amount of another computing resource associated with the task identifier can also be allocated to the task such that the computing resources associated with a task identifier are scaled and throttled together. For example, if an additional 20% of the processor cycles are allocation to the task based on the resource credit balance, an addition 20% of cache can also be allocated to the task.

At block 1718, the additional amount of the computing resource allocated to the task is decremented from the resource credit balance. This can be performed, for example, by automatic resource management module 404. In some embodiments, to prevent accumulating the unused amount of the computing resource indefinitely, the resource credit balance associated with a task identifier from a particular time interval can be reset to zero or expires after a predetermined number of time intervals (e.g., number of time intervals that equal an hour, a day, a month, etc.) has elapsed from that time interval. In other words, any accumulated resource credit from a particular time interval that remains unused after a predetermined number of time intervals may expire and be decremented from the resource credit balance. In some embodiments in which the allocations of computing resources are scaled together, a resource credit balance for one computing resource can be used to imply an unused amount of another computing resource. For example, a resource credit balance amounting to an unused 50% of processor cycles may imply an unused 50% of cache. As such, an unused 50% of the cache can be banked over a time interval even though only the processor utilization is being tracked.

While the above description of process 1700 has been described with reference to tracking a resource credit balance for one computing resource, it should be understood that execution of a task involving multiple computing resources may have a separate resource credit balance for one or more of the computing resources. In some embodiments, a resource credit balance for one computing resource can be applied to obtain additional credits for another computer resource, and the exchange may be governed by an credit exchange rate between different types of computing resources. In some embodiments, unused amounts of the different computing resources can be accumulated into a single resource credit balance, in which different types of computing resources may be given a different rate of unused credits. For example, unused processor cycles may have a value of 1 credit, whereas unused cache may have a value of 5 credits.

It should be appreciated that the specific steps illustrated in FIG. 14 and/or 16 may provide a particular order of steps in some embodiments. However, other sequences of steps may also be performed in alternate embodiments. For example, alternative embodiments may perform the steps/blocks outlined above in a different order. Moreover, the individual steps/blocks illustrated in FIG. 14 and/or 16 may include multiple sub-steps that may be performed in various sequences as appropriate to the individual step. Furthermore, additional steps/blocks may be added or removed depending on the particular applications. One of ordinary skill in the art would recognize and appreciate many variations, modifications and alternatives of the process.

Figure 18:
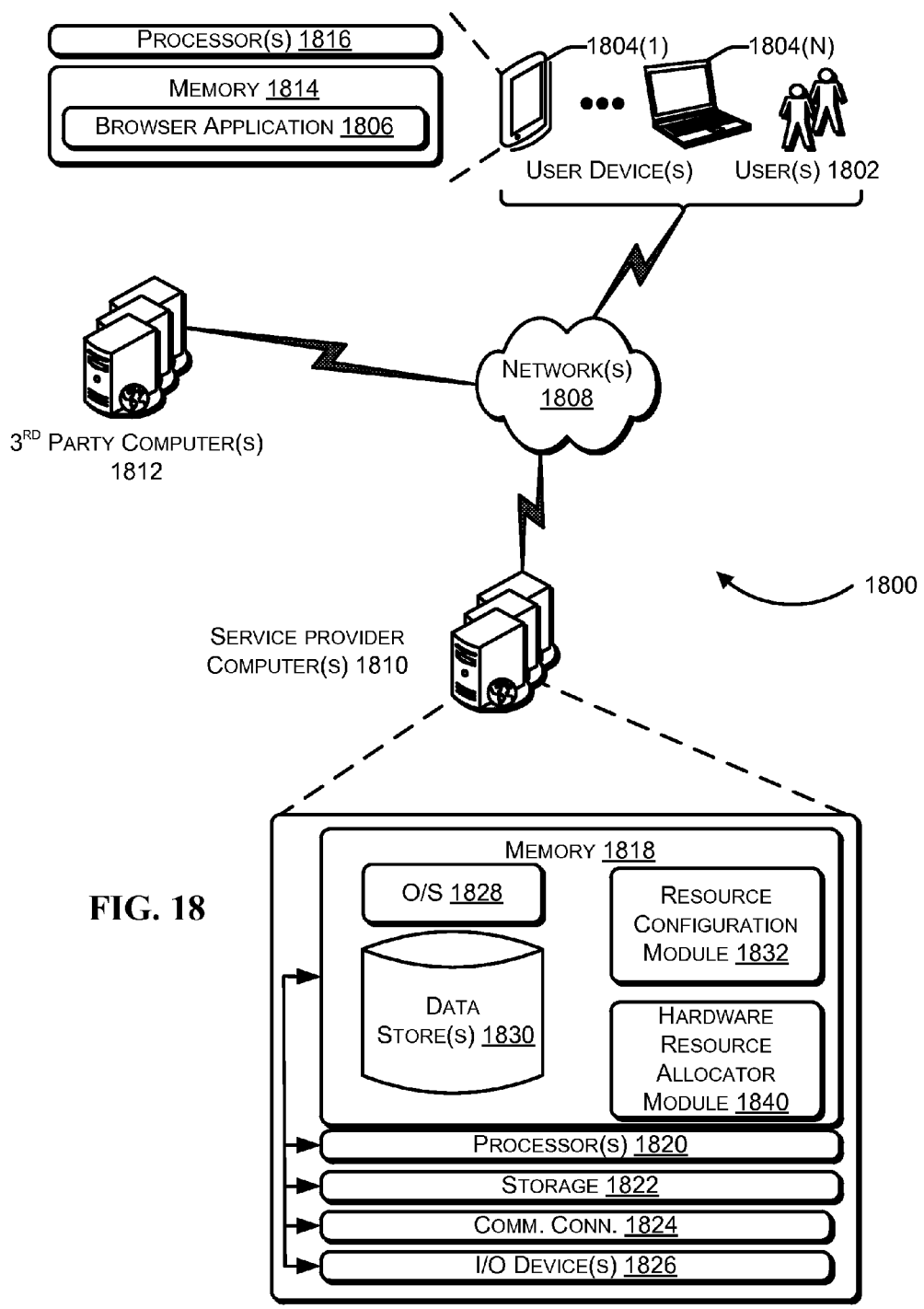
FIG. 18 illustrates an exemplary architecture for features and systems described herein that includes one or more service provider computers and/or a user device connected via one or more networks, according to at least one exemplary embodiment.

FIG. 18 illustrates an exemplary architecture for features and systems described herein that includes one or more service provider computers and/or a user device connected via one or more networks, according to at least one exemplary embodiment. The devices discussed in FIGS. 1-16, may use one or more components of the computing devices described in FIG. 18 or may represent one or more computing devices described in FIG. 18. In architecture 1800, one or more users 1802 may utilize user computing devices 1804(1)-(N) (collectively, user devices 1804) to access application 1806 (e.g., a web browser or mobile device application), via one or more networks 1808. In some aspects, application 1806 may be hosted, managed and/or provided by a computing resources service or service provider. One or more service provider computers 1810 may provide a native application which is configured to run on user devices 1804 which user(s) 1802 may interact with. Service provider computer(s) 1810 may, in some examples, provide computing resources such as, but not limited to, client entities, low latency data storage, durable data storage, data access, management, virtualization, cloud-based software solutions, electronic content performance management, etc. Service provider computer(s) 1810 may also be operable to provide web hosting, computer application development and/or implementation platforms, combinations of the foregoing or the like to user(s) 1802. Service provider computer(s) 1810, in some examples, may communicate with one or more third party computers 1812.

In some examples, network(s) 1808 may include any one or a combination of many different types of networks, such as cable networks, the Internet, wireless networks, cellular networks and other private and/or public networks. While the illustrated example represents user(s) 1802 accessing application 1806 over network(s) 1808, the described techniques may equally apply in instances where user(s) 1802 interact with service provider computer(s) 1810 via user device(s) 1804 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 1806 may allow user(s) 1802 to interact with service provider computer(s) 1810 such as to access web content (e.g., web pages, music, video, etc.). Service provider computer(s) 1810, perhaps arranged in a cluster of servers or as a server farm, may host application 1806 and/or cloud-based software services. Other server architectures may also be used to host application 1806. Application 1806 may be capable of handling requests from many users 1802 and serving, in response, various item web pages. Application 1806 can provide any type of website that supports user interaction, including social networking sites, online retailers, informational sites, blog sites, search engine sites, news and entertainment sites and so forth. As discussed above, the described techniques can similarly be implemented outside of application 1806, such as with other applications running on user device(s) 1804.

User device(s) 1804 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 1804 may be in communication with service provider computer(s) 1810 via network(s) 1808, or via other network connections. Additionally, user device(s) 1804 may be part of the distributed system managed by, controlled by or otherwise part of service provider computer(s) 1810 (e.g., a console device integrated with service provider computers 1810).

In one illustrative configuration, user device(s) 1804 may include at least one memory 1814 and one or more processing units (or processor(s)) 1816. Processor(s) 1816 may be implemented as appropriate in hardware, computer-executable instructions, firmware, or combinations thereof. Computer-executable instruction or firmware implementations of processor(s) 1816 may include computer-executable or machine-executable instructions written in any suitable programming language to perform the various functions described. User device(s) 1804 may also include geo-location devices (e.g., a global positioning system (GPS) device or the like) for providing and/or recording geographic location information associated with user device(s) 1804.

Memory 1814 may store program instructions that are loadable and executable on processor(s) 1816, as well as data generated during the execution of these programs. Depending on the configuration and type of user device(s) 1804, memory 1814 may be volatile (such as random access memory (RAM)) and/or non-volatile (such as read-only memory (ROM), flash memory, etc.). User device(s) 1804 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 1814 may include multiple different types of memory, such as static random access memory (SRAM), dynamic random access memory (DRAM), or ROM.

Turning to the contents of memory 1814 in more detail, memory 1814 may include an operating system and one or more application programs or services for implementing the features disclosed herein including at least a user provided input element or electronic service web page, such as via browser application 1806 or dedicated applications (e.g., smart phone applications, tablet applications, etc.). Browser application 1806 may be configured to receive, store and/or display a website or other interface for interacting with service provider computer(s) 1810. Additionally, memory 1814 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 1804.

In some aspects, service provider computer(s) 1810 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 1810 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 1810 may be in communication with user device(s) 1804 and/or other service providers via network(s) 1808, or via other network connections. Service provider computer(s) 1810 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 1810 may include at least one memory 1818 and one or more processing units (or processor(s)) 1820. Processor(s) 1820 may be implemented as appropriate in hardware, computer-executable instructions, firmware or combinations thereof. Computer-executable instruction or firmware implementations of processor(s) 1820 may include computer-executable or machine-executable instructions written in any suitable programming language to perform the various functions described.

In some instances, hardware processor(s) 1820 may be a single core processor or a multi-core processor. A multi-core processor may include multiple processing units within the same processor. In some embodiments, the multi-core processors may share certain resources, such as busses and first, second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 1818 may store program instructions that are loadable and executable on processor(s) 1820, as well as data generated during the execution of these programs. Depending on the configuration and type of service provider computer(s) 1810, memory 1818 may be volatile (such as RAM) and/or non-volatile (such as ROM, flash memory, etc.). Service provider computer(s) 1810 or servers may also include additional storage 1822, which may include removable storage and/or non-removable storage. The additional storage 1822 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 1818 may include multiple different types of memory, such as SRAM, DRAM, or ROM.

Memory 1818, the additional storage 1822, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 1818 and the additional storage 1822 are all examples of computer storage media. Additional types of computer storage media that may be present in service provider computer(s) 1810 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 1810. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 1810 may also contain communications connection(s) 1824 that allow service provider computer(s) 1810 to communicate with a stored database, another computing device or server, user terminals and/or other devices on network(s) 1808. Service provider computer(s) 1810 may also include I/O device(s) 1826, such as a keyboard, a mouse, a pen, a voice input device, a touch input device, a display, speakers, a printer and the like.

Memory 1818 may include an operating system 1828, one or more data stores 1830 and/or one or more application programs or services for implementing the features disclosed herein, including an resource configuration module 1832 and a hardware resource allocator module 1840. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 18, and/or functions described herein can be provided by one or more modules that exist as separate modules and/or module functions described herein can be spread over multiple modules.

Figure 19:
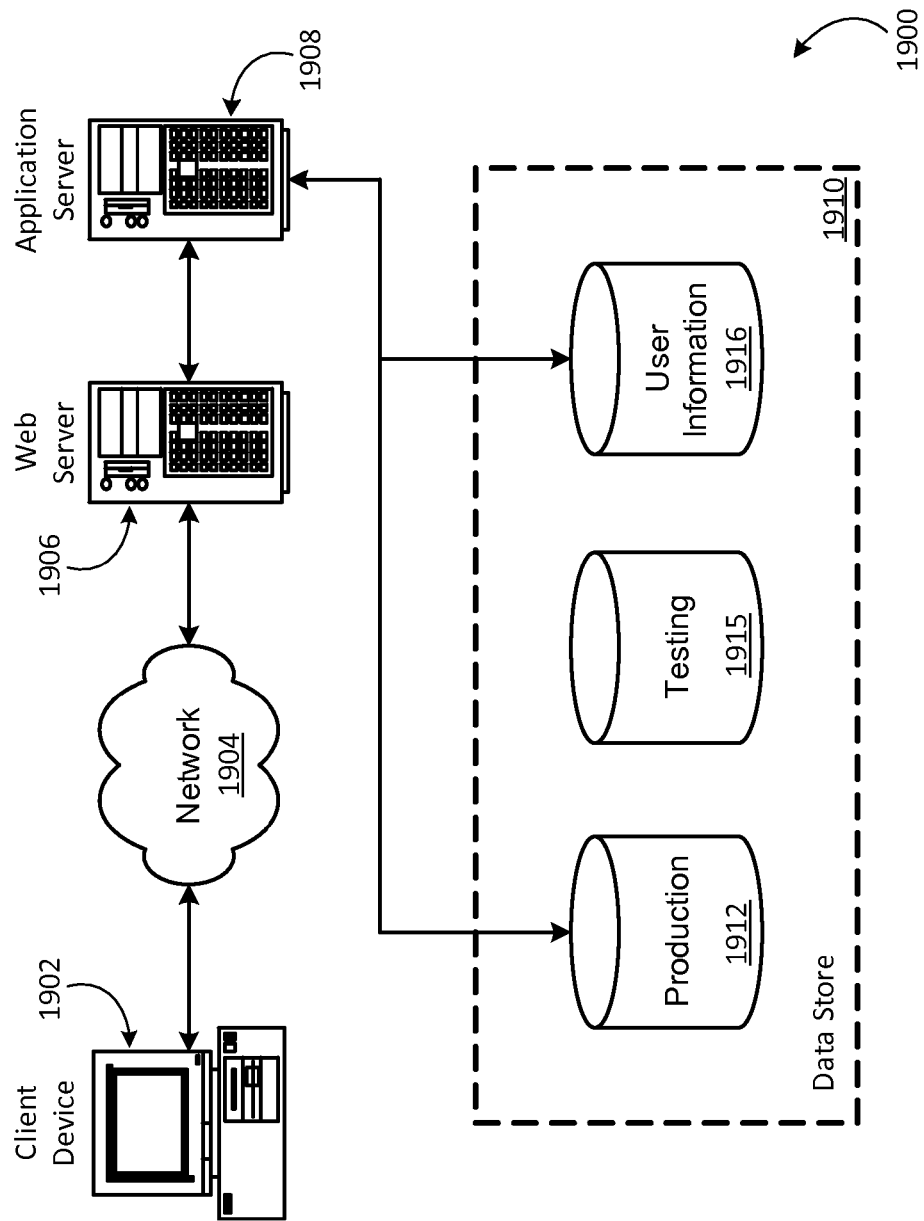
FIG. 19 illustrates an environment in which various embodiments can be implemented.

FIG. 19 illustrates aspects of an exemplary environment 1900 for implementing various embodiments. As will be appreciated, although a Web-based environment is used for purposes of explanation, different environments may be used, as appropriate, to implement various embodiments. The environment includes an electronic client device 1902, which can include any appropriate device operable to send and receive requests, messages or information over an appropriate network 1904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1906 for receiving requests and serving content in response thereto, although for other networks an alternative device serving a similar purpose could be used as would be apparent to one of ordinary skill in the art.

The illustrative environment includes at least one application server 1908 and a data store 1910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between client device 1902 and application server 1908, can be handled by the Web server. It should be understood that the Web and application servers are not required and are merely example components, as structured code discussed herein can be executed on any appropriate device or host machine as discussed elsewhere herein.

Data store 1910 can include several separate data tables, databases or other data storage mechanisms and media for storing data relating to a particular aspect. For example, the data store illustrated includes mechanisms for storing production data 1912 and user information 1916, which can be used to serve content for the production side. The data store may also include a mechanism for storing log data, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in data store 1910. Data store 1910 is operable, through logic associated therewith, to receive instructions from application server 1908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on user device 1902. Information for a particular item of interest can be viewed in a dedicated page or window of the browser. Several different types of devices, such as user devices and servers have been described with reference to FIG. 19. The devices discussed in FIGS. 1-16, may use one or more components of the devices described in FIG. 19 and/or represent one or more devices described in FIG. 19.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 19. Thus, the depiction of system 1900 in FIG. 19 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

In various embodiments, a CPU may be referred to as a hardware processor or processing unit. In some instances, the processor may be a single core processor or a multi-core processor. A multi-core processor may include multiple processing units within the same processor. In some embodiments, the multi-core processors may share certain resources, such as busses and first, second or third level of cache between multiple-cores. In some instances, each core in a single or multi-core processor may also include multiple executing logical processors (or threads). In such a core, that supports multiple logical processors, several stages of the execution pipeline and also lower level caches may also be shared.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:
1. A computer-implemented method comprising:
receiving a request to execute a task for a tenant on shared hardware resources;
determining a baseline resource credit per time interval of a computing resource for the tenant, wherein the computing resource is among the shared hardware resources;
monitoring a performance metric associated with the computing resource to determine a utilization amount of the computing resource by the task during a first time interval;
determining an unused amount of the computing resource in the first time interval based on a difference between the utilization amount and the baseline resource credit;
incrementing a resource credit balance by the unused amount of the computing resource;
determining that a workload of the task during a second time interval is demanding an additional amount of the computing resource in addition to the baseline resource credit of the computing resource;
allocating the additional amount of the computing resource to the task, the additional amount being less than or equal to the resource credit balance, wherein the additional amount corresponds to a percentage increase of the computing resource; and allocating the same percentage increase of an additional computing resource to the task, wherein the additional computing resource includes cache and the computing resource includes processor cycles.

2. The computer-implemented method of claim 1, further comprising:
decrementing the resource credit balance by the additional amount of the computing resource allocated to the task.

3. The computer-implemented method of claim 1, wherein the resource credit balance from the first time interval is set to zero after a predetermined number of time intervals have elapsed and if the resource credit balance from the first time interval has not been exhausted since the first time interval, wherein resource credit balances from earlier intervals are exhausted before resource credit balances from later intervals.

4. The computer-implemented method of claim 1, wherein the performance metric is one of an instruction counter, a cache miss counter, a cache hit counter, a memory controller read byte counter, a memory controller write byte counter, or a network data traffic counter.

5. A computer-implemented method comprising:
associating, with a task, at least a baseline amount of a computing resource for each time interval of a predetermined number of time intervals;
monitoring a consumption of the computing resource by the task in each time interval;
accumulating an unused amount of the computing resource during at least some of the time intervals;
applying at least some of the accumulated unused amount of the computing resource to provide a first percentage increase of the computing resource allocated to the task when a workload of the task consumes more than the baseline amount of the computing resource in a given one of the time intervals; and
applying an additional amount of an additional computing resource to provide a second percentage increase of the additional computing resource allocated to the task when the workload of the task consumes more than the baseline amount of the computing resource in the given one of the time intervals, wherein the additional computing resource includes cache and the computing resource includes processor cycles, and wherein the first percentage increase equals the second percentage increase.

6. The computer-implemented method of claim 5, wherein the accumulated amount of the computing resource from a particular time interval expires after the predetermined number of time intervals have elapsed since that particular time interval, wherein computing resources accumulated during an earlier one of the time intervals are exhausted before computing resources accumulated during a later one of the time intervals.

7. The computer-implemented method of claim 5, wherein monitoring the consumption of the computing resource includes monitoring a performance metric associated with the computing resource.

8. The computer-implemented method of claim 7, wherein the performance metric is one of an instruction counter, a cache miss counter, a cache hit counter, a memory controller read byte counter, a memory controller write byte counter, or a network data traffic counter.

9. The computer-implemented method of claim 5, wherein the computing resource is a processor, a coprocessor or a specialized execution unit.

10. The computer-implemented method of claim 5, wherein the additional computing resource further includes one of a memory resource, a storage resource, or an I/O (input/output) resource.

11. The computer-implemented method of claim 5, wherein the baseline amount of the computing resource is determined by a service level agreement associated with the tenant.

12. A computing device comprising:
a processing unit include one or more processor cores; and
a hardware resource allocator configured to:
associate, with a task, at least a baseline amount of processor cycles of the one or more processor cores for each time interval of a predetermined number of time intervals;
monitor a consumption of the processor cycles by the task in each time interval;
accumulate an unused amount of the processor cycles during at least some of the time intervals;
apply at least some of the accumulated amount of the processor cycles to the task when a workload of the task consumes more than the baseline amount of the processor cycles in a given one of the time intervals; and
apply an additional computing resource, other than the processor cycles, to the task when the workload of the task consumes more than the baseline amount of the processor cycles in the given one of the time intervals,
wherein applying the at least some of the accumulated amount of the processor cycles to the task includes allocating a first percentage increase of the processor cycles to the task, and wherein applying the additional computing resource to the task includes allocating a second percentage increase of the additional computing resource to the task, the first percentage increase being the same as the second percentage increase, wherein the additional computing resource includes cache.

13. The computing device of claim 12, wherein the baseline amount of the processor cycles is determined by a service level agreement associated with a tenant.

* * * * *